United States Patent
Yoshida

(10) Patent No.: US 10,852,602 B2
(45) Date of Patent: Dec. 1, 2020

(54) DISPLAY DEVICE

(71) Applicant: Sharp Kabushiki Kaisha, Sakai (JP)

(72) Inventor: Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 16 days.

(21) Appl. No.: 16/377,324

(22) Filed: Apr. 8, 2019

(65) Prior Publication Data

US 2019/0318702 A1  Oct. 17, 2019

(30) Foreign Application Priority Data

Apr. 12, 2018  (JP) .................. 2018-076669

(51) Int. Cl.
| | |
|---|---|
| *G02F 1/1362* | (2006.01) |
| *G09G 3/36* | (2006.01) |
| *G06F 3/041* | (2006.01) |
| *G02F 1/13* | (2006.01) |

(52) U.S. Cl.
CPC ...... *G02F 1/136259* (2013.01); *G02F 1/1309* (2013.01); *G02F 1/136286* (2013.01); *G06F 3/0412* (2013.01); *G09G 3/3648* (2013.01); *G02F 2001/136263* (2013.01); *G02F 2001/136272* (2013.01); *G02F 2201/506* (2013.01); *G09G 2330/08* (2013.01)

(58) Field of Classification Search
CPC ......... G06F 3/0412; G06F 3/044–0448; G02F 1/1309; G02F 1/136259; G02F 2001/136263; G02F 2001/136272; G02F 2201/506; G09G 2330/08
See application file for complete search history.

(56) References Cited

U.S. PATENT DOCUMENTS

| | | | | |
|---|---|---|---|---|
| 10,088,715 | B2 * | 10/2018 | Yeh ..................... | G02F 1/13439 |
| 10,495,928 | B2 * | 12/2019 | Yeh ..................... | G02F 1/13394 |
| 10,545,588 | B2 * | 1/2020 | Li .......................... | G06F 3/0412 |
| 10,649,566 | B2 * | 5/2020 | Yeh ....................... | G06F 3/0412 |
| 2018/0188858 | A1 * | 7/2018 | Zhang .................... | G06F 3/047 |
| 2018/0188867 | A1 * | 7/2018 | Yeh ........................ | G06F 3/0416 |
| 2018/0356924 | A1 * | 12/2018 | Hsieh ................... | G02F 1/13458 |

FOREIGN PATENT DOCUMENTS

JP        10-232412 A      9/1998

* cited by examiner

*Primary Examiner* — Gene W Lee
(74) *Attorney, Agent, or Firm* — Keating & Bennett, LLP

(57) ABSTRACT

A display device includes a pixel electrode, signal lines, lines, and inter-line connections. The signal lines supply an image signal to the pixel electrode. The lines are arranged such that the lines at least partly overlap the signal lines, respectively, via an insulating film but do not overlap the pixel electrode. The inter-line connections interconnect the lines. The inter-line connections are arranged at intervals in a direction of extension of the lines.

14 Claims, 14 Drawing Sheets

DISPLAY DEVICE

CROSS REFERENCE TO RELATED APPLICATION

This application claims priority from Japanese Patent Application No. 2018-076669 filed on Apr. 12, 2018. The entire contents of the priority application are incorporated herein by reference.

TECHNICAL FIELD

The technology described herein relates to a display device.

BACKGROUND

Japanese Unexamined Patent Application Publication Number 10-232412 has been known as a technology for repairing a defect developed on a data line included in a display device. According to Japanese Unexamined Patent Application Publication Number 10-232412, spare lines are provided under pixel electrodes such that the spare lines are parallel with data lines. For each pixel, the spared lines are electrically connected to Cs lines through contacts and are usually supplied with the same voltage supplied to the Cs lines. When a data line is broken, a spare line adjacent to the broken data line is cut outside intersections between the spare line and two Cs lines sandwiching a broken spot therebetween in a wiring direction to isolate a cut section, and the two Cs lines sandwiching broken spot are cut outside intersections between the Cs lines and the data line and spare line in the wiring direction to isolate a cut section, and then the data line is electrically connected to the Cs lines separated from the cut section. This maintains voltage application to the data line.

SUMMARY

According to Japanese Unexamined Patent Application Publication Number 10-232412, the broken data line is repaired using the spare line connected to the Cs lines. However, spare lines do not overlap data lines and are arranged at intervals such that each spare line is sandwiched between a pair of date lines in a direction of extension of gate lines. In addition, the spare lines overlap the pixel electrodes. This arrangement leads to a lower open-area percentage or the like, posing a problem with achieving high definition capability.

The technology described herein was made in view of the above circumstances. An object is to enable repair of a signal line while suppressing a drop in an open-area percentage.

A display device according to the technology described herein includes a pixel electrode, signal lines, lines, and inter-line connections. The signal lines supply an image signal to the pixel electrode. The lines are arranged such that the lines at least partly overlap the signal lines, respectively, via an insulating film but do not overlap the pixel electrode. The inter-line connections interconnect the lines. The inter-line connections are arranged at intervals in a direction of extension of the lines.

Each pixel electrode comes to have a potential based on an image signal supplied from a signal line. The liens at least partly overlap the signal lines, respectively, via the insulating film and are interconnected through the inter-line connections arranged at intervals in the direction of extension of the liens. In this configuration, when any one of the signal lines is broken, the broken signal line can be repaired using a line overlapping the broken signal line.

Repair work is carried out in the following manner. A laser beam or the like is emitted on two spots of the line overlapping the broken signal line via the insulating film, the two spots sandwiching the broken spot of the signal line therebetween in a direction of extension of the line, to short-circuit the line and the broken signal line. Meanwhile, to electrically isolate two inter-line connections sandwiching the broken spot of the signal line therebetween in the direction of extension of the line from the line overlapping the broken signal line, the line and the inter-line connections connected thereto are cut properly. Through these processes, a part of the line overlapping the broken signal line, the part lying astride the broken spot, is short-circuited to the signal line, and is electrically isolated from another line to be connected through the inter-line connections. An image signal thus travels through the above part of the line to bypass the broken spot of the signal line and reaches the pixel electrode. A signal originally transmitted by the line having its part used for repairing the signal line is transmitted through another line connected to the above line through the inter-line connections.

The above arrangement in which the line at least partly overlaps the signal line, in comparison with an arrangement in which the line does not overlap the signal line, allows a reduction in a space for arranging the line and the signal line, and is therefore preferable as the arrangement for improving the open-area percentage. The arrangement also leads to an improvement in a degree of freedom in determining the location of a spot where the line and the signal line are short-circuited. In addition, because the line does not overlap the pixel electrode, when a process of laser beam emission or the like is carried out to short-circuit the line and the signal line, the process hardly affects the pixel electrode. A secondary problem caused by the process of laser beam emission or the like, therefore, hardly occurs. When wire-breaking repair is not carried out, the lines are kept interconnected through the inter-line connections. This reduces wiring resistance.

According to the technology described herein, repair of a signal line can be carried out as a drop in the open-area percentage is suppressed.

DETAILED DESCRIPTION

First Embodiment

Figure 3:
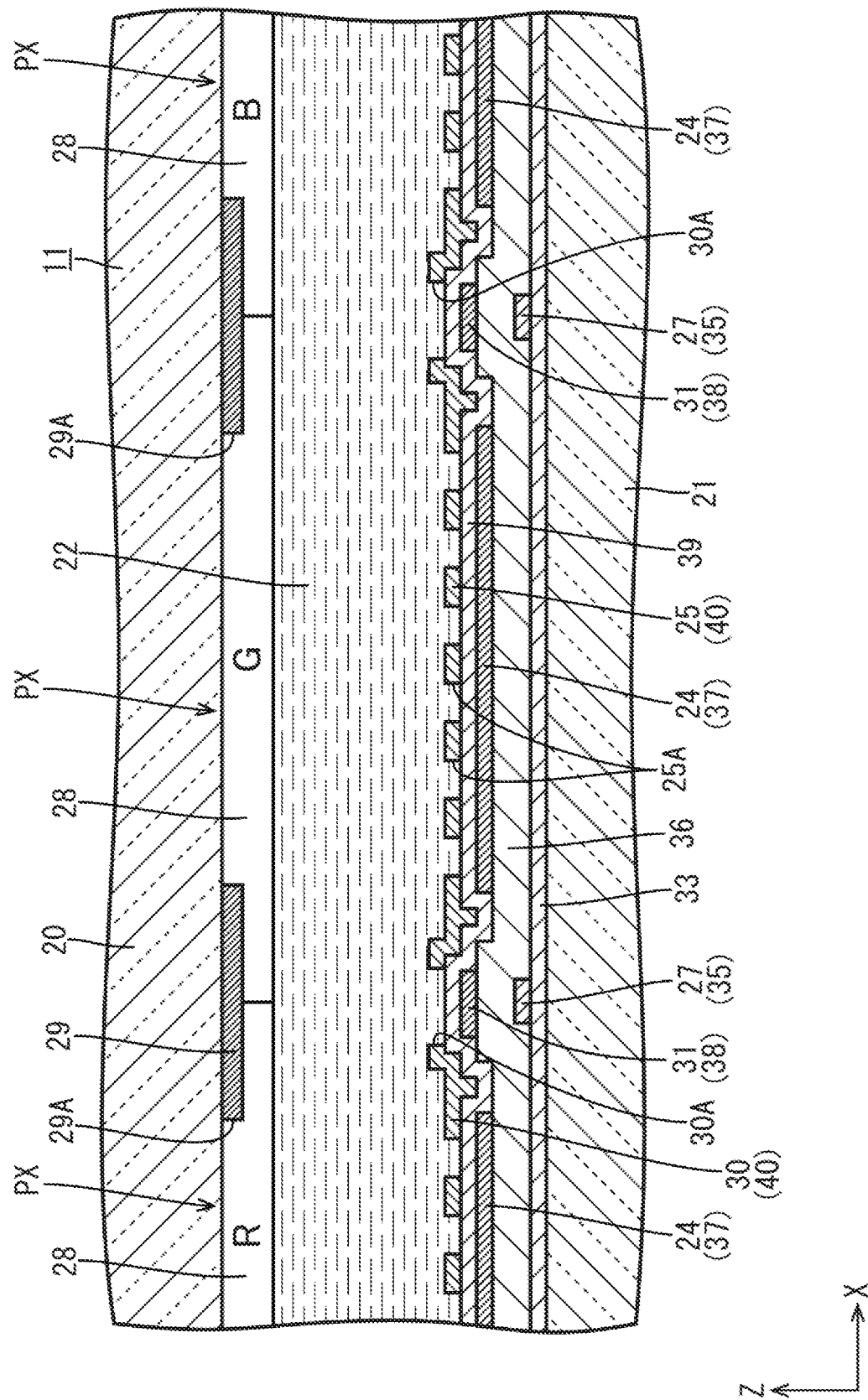
FIG. 3 is a sectional view of the liquid crystal panel of FIG. 2 that is taken along an A-A line in FIG. 2.
Figure 4:
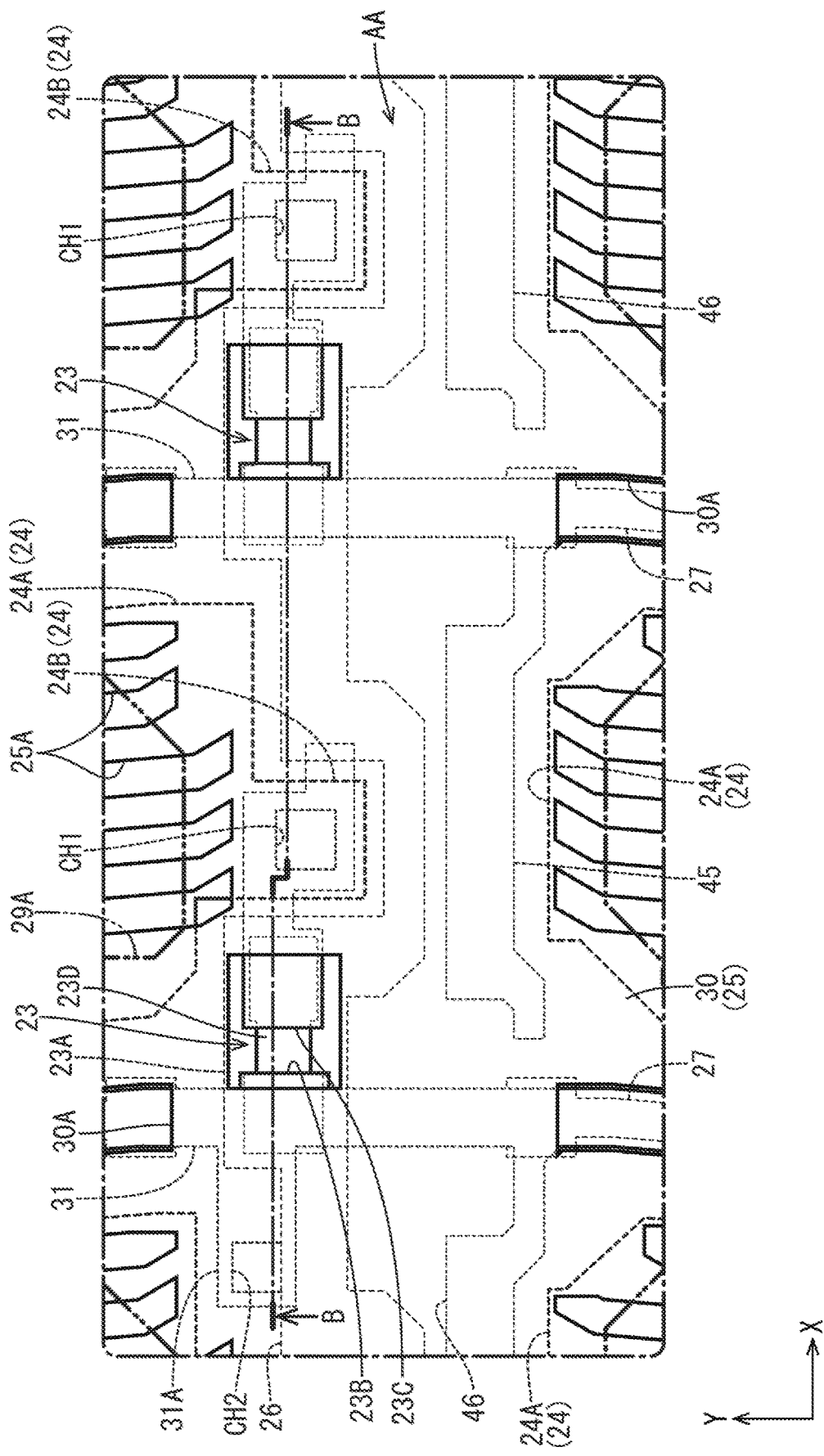
FIG. 4 is a plan view of the vicinity of TFTs in an array substrate and a CF substrate that make up the liquid crystal panel.
Figure 5:
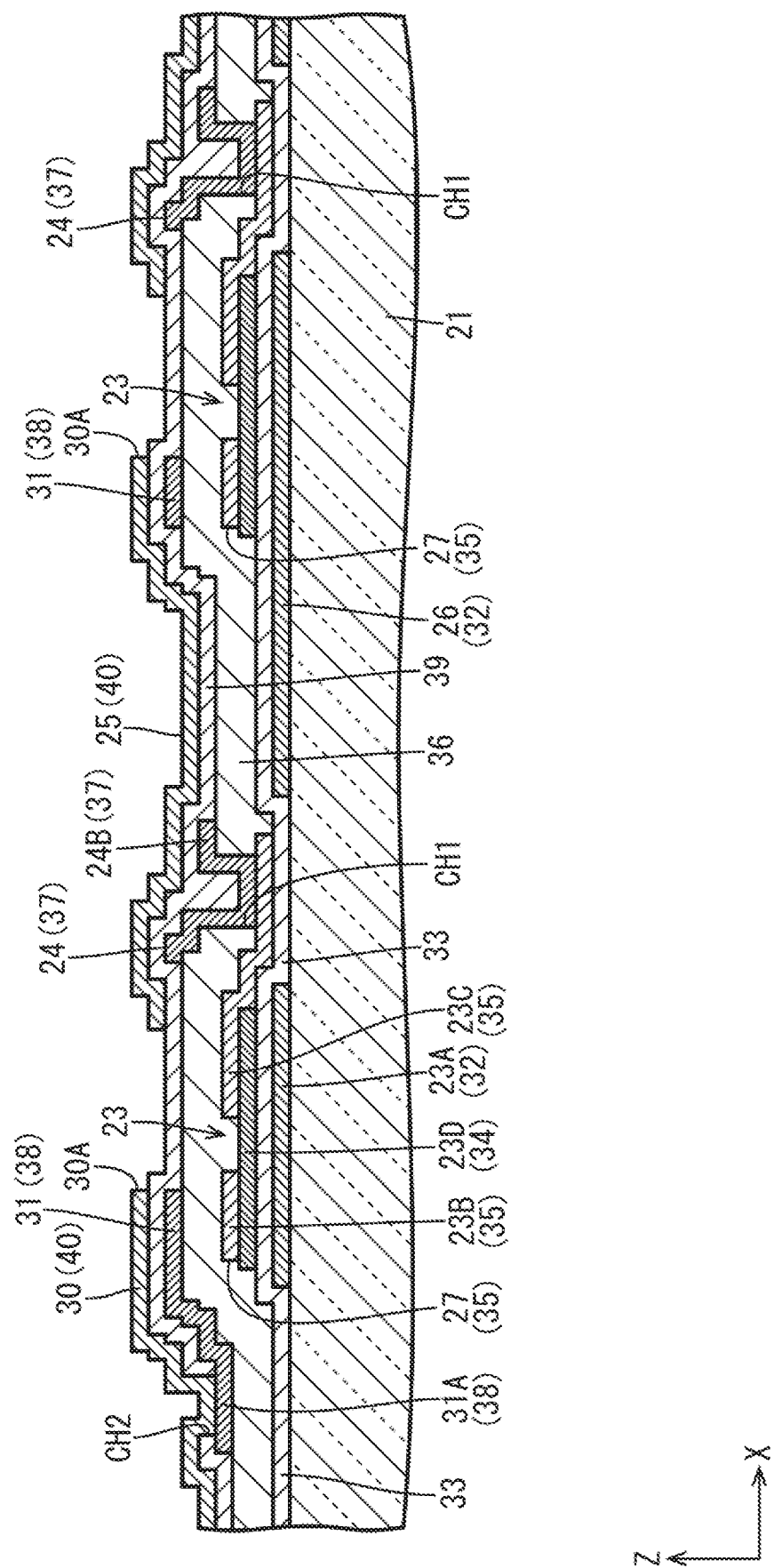
FIG. 5 is a sectional view of the array substrate of FIG. 4 that is taken along a B-B line in FIG. 4.

A first embodiment will be described with reference to FIGS. 1 to 10. In the first embodiment, a liquid crystal display device 10 (display device with a position input function) having a display function and a touch panel function (position input function) will be described. Each of the drawings has the X-axis, the Y-axis, or the Z-axis described therein such that the X-axis, the Y-axis, or the Z-axis points the same X-axis direction, Y-axis direction, or Z-axis direction, respectively, in each drawing. The upper side in FIGS. 3, 5, and 10 is defined as a front side and the lower side in the same as a back side.

Figure 1:
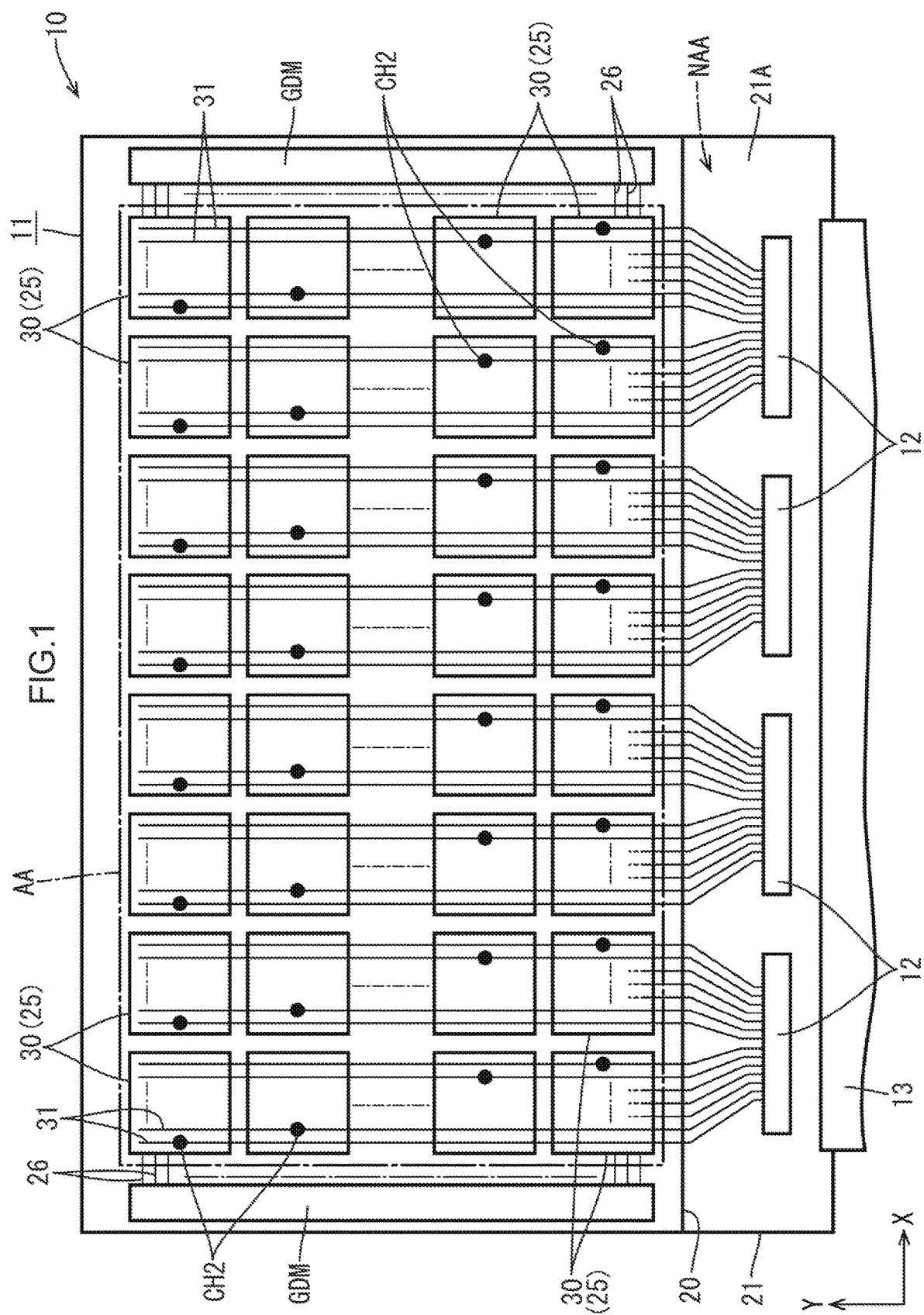
FIG. 1 is a plan view of touch electrodes, touch lines, and the like of a liquid crystal panel included in a liquid crystal display device according to a first embodiment.

FIG. 1 is a schematic plan view of a liquid crystal panel 11. As shown in FIG. 1, the liquid crystal display device 10 is of a laterally elongated rectangle, and includes at least the liquid crystal panel (display device, display panel, or display panel with the position input function) 11 configured to display an image, and a backlight unit (lighting device) serving as an external light source that emits light onto the liquid crystal panel 11 for displaying an image. According to this embodiment, the liquid crystal panel 11 has a screen size of, for example, about 16 inches (specifically, 16.1 inches) and offers resolution performance equivalent to "FHD". The backlight unit is disposed on the back side (rear side) of the liquid crystal panel 11, and has light sources, such as LEDs, that emit white light and an optical member that acts optically on light from the light sources to transform the light into a planar beam of light. The backlight unit is not depicted in FIG. 1.

As shown in FIG. 1, on the liquid crystal panel 11, a central part of its screen serves as a display area AA (range indicated by a single-dot chain line in FIG. 1) in which an image is displayed. In contrast, a frame-shaped peripheral part of the screen of the liquid crystal panel 11, the peripheral part encircling the display area AA, serves as a non-display area NAA in which no image is displayed. The liquid crystal panel 11 is constructed by pasting together a pair of substrates 20 and 21. One of the pair of substrates 20 and 21 that is on the front side is a CF substrate (counter substrate) 20, and the other on the back side (rear side) is an array substrate (active matrix or element substrate) 21. Each of the CF substrate 20 and the array substrate 21 is formed by stacking various films on the inner surface of a glass substrate. On the outer surfaces of the substrates 20 and 21, polarizers (not depicted) are pasted, respectively. The CF substrate 20 is smaller in short side dimension than the array substrate 21, and is pasted to the array substrate 21 such that one end of the CF substrate 20 in the direction of short sides (Y-axis direction) is matched to the corresponding one end of the array substrate 21. As a result, the other end of the array substrate 21 in the direction of short sides projects sidewise relative to the CF substrate 20, creating a CF substrate non-overlapping section 21A where the array substrate 21 does not overlap the CF substrate 20. The CF substrate non-overlapping section 21A carries drivers 12 (drive circuits) that supplies various signals related to the display function and the touch panel function, which will be described later, and a flexible board 13 (signal transmitting portion). Each driver 12 is composed of an LSI chip having a built-in drive circuit, is mounted on the array substrate 21 by a chip-on-glass (COG) method, and processes various incoming signals from the flexible board 13. According to this embodiment, four drivers 12 are lined up at intervals in the X-axis direction in the non-overlapping area NAA of the liquid crystal panel 11. The flexible board 13 is constructed by forming a number of wiring patterns (not depicted) on a base material made of a synthetic resin material (e.g., polyimide-based resin) having insulation property and flexibility. The flexible board 13 has one end connected to the non-display area NAA of the liquid crystal panel 11 and the other end connected to a control board (signal supply), which is not depicted. Various signals supplied from the control board travels through the flexible board 13 to the liquid crystal panel 11, where the signals are processed by the drivers 12 in the non-display area NAA and are output to the display area AA. In the non-display area NAA of the array substrate 21, a pair of gate circuits GDM are disposed such that they sandwich the display area AA from both sides in the X-axis direction. The gate circuits GDM are circuits for supplying scanning signals to gate lines 26, which will be described later.

The liquid crystal panel 11 according to this embodiment has the display function of displaying images and the touch panel function of detecting a user's input position (input position) based on a displayed image. The liquid crystal panel 11 has a touch panel pattern for exerting the touch panel function in the form of an integrated pattern (in-cell pattern). The touch panel pattern is a so-called reflective capacitance-sensing touch panel pattern and detects a touch by a self-capacitance method. As shown in FIG. 1, the touch panel pattern is made up of a matrix of touch electrodes (position detecting electrodes) 30 arranged on a plate surface of the liquid crystal panel 11. The touch electrodes 30 are located in the display area AA of the liquid crystal panel 11. The display area AA of the liquid crystal panel 11, therefore, substantially matches a touch area (position input area) where an input position can be detected, while the non-display area NAA substantially matches a non-touch area (position non-input area) where an input position cannot be detected. When the user intends to make position input based on an image the user recognizes in the display area AA of the liquid crystal panel 11 and moves a finger (position input object not depicted), which is a conductor, closer to the surfaced (display surface) of the liquid crystal panel 11, capacitance is created between the finger and a touch electrode 30. The capacitance detected by the touch electrode 30 close to the finger changes as the finger moves closer to the touch electrode 30 and therefore becomes different from capacitance detected by a touch electrode 30 located distant from the finger. Based on this capacitance change, an input position can be detected. The touch electrodes 30 are arranged such that in the display area AA, rows of touch electrodes 30 are lined up at intervals in the X-axis direction (direction in which rows of pixel electrodes 24 are lined up to sandwich lows of touch lines 31 therebetween) and in the Y-axis direction (direction in which the touch lines 31 extend) to form a matrix pattern. In a plan view, each touch electrode 30 is substantially of a square whose one side is several mm (e.g., 2 mm to 6 mm) and should preferably be about 5.1 mm or longer in length. The touch electrode 30 thus has a size in a plan view much larger than that of a pixel PX, which will be described later, and therefore occupies a range that covers, for example, scores of pixels PX in the X-axis and Y-axis directions. To the touch electrodes 30, the touch lines (lines or position detection lines) 31 included in the liquid crystal panel 11 are connected selectively. The touch lines 31 extend in the Y-axis direction and are connected selectively to specific touch electrodes 30 among rows of the touch electrodes 30 lined up in the Y-axis direction. More specifically, according to this embodiment, a group of touch lines 31 overlap a group of touch electrodes 30 making a row in the Y-axis direction, and a group of touch lines 31 are connected selectively to each of the touch electrodes 30 making up the row. Specifically, the number of touch lines 31 overlapping one touch electrode 30 is determined to be about two times the number of touch electrodes 30 making up the row in the Y-axis direction, and two touch lines 31 are connected to one touch electrode 30 to reduce line resistance and provide a redundant line configuration. To achieve this connection form, the length of one side of the touch electrode 30 must be equal to or larger than a given length. In the case of the liquid crystal panel 11 of this embodiment having the screen size of 16.1 inches and offering the resolution performance equivalent to "FHD", the length of one side of the touch electrode 30 must be equal to or larger than 5.1 mm. Specifically, according to this embodiment, the number of source lines 27 and touch lines 31 that overlap one touch electrode 30 is equal to a value given by dividing the length of one side of the touch electrode 30, the length being 5.1 mm in this embodiment, by a pitch of arrangement of pixels PX in the X-axis direction, the pitch being 62 μm in this embodiment. This value is 82 in this embodiment, and is about two times the number of touch electrodes 30 making up the row in the Y-axis direction, the number being 40 in this embodiment. In this configuration, according to this embodiment, two touch lines 31 are connected to every touch electrode 30. In FIG. 1, spots at which touch lines 31 are connected to touch electrodes 30 are represented by black circles. The touch lines 31 are connected also to detection circuits (not depicted). The detection circuits may be included in the drivers 12 or may be disposed outside the liquid crystal panel 11 via the flexible board 13. FIG. 1 diagrammatically depicts arrangement of the touch electrodes 30, and the number, arrangement, and plane shape of the touch electrodes 30 may be changed properly to be different from those indicated in FIG. 1.

Figure 2:
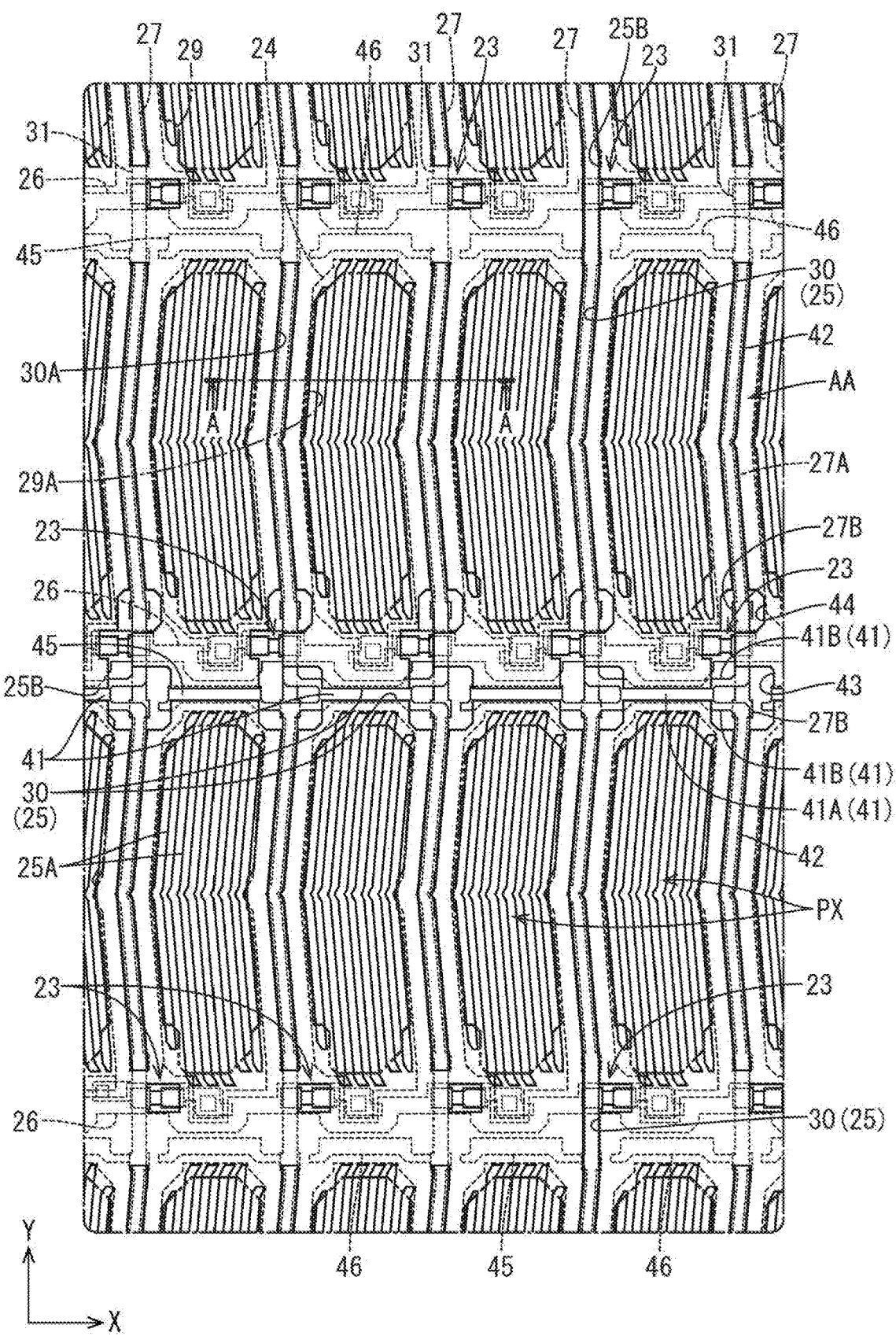
FIG. 2 is a plan view of arrangement of pixels of the liquid crystal panel.

FIG. 2 is a plan view of a part of the array substrate 21 making up the liquid crystal panel 11, the part being in the display area AA. As shown in FIG. 2, each touch electrode 30 has a touch line overlapping opening (line overlapping opening or position detection line overlapping opening) 30A overlapping a part of each touch line 31. Each touch line overlapping opening 30A extends in parallel with the Y-axis direction in which the touch line 31 extends, and is of a vertically elongated shape (rectangle whose longitudinal direction matches the direction of extension of the touch line 31) in a plan view. The touch line overlapping opening 30A is larger in width dimension (dimension in the X-axis direction) than the touch line 31. In this manner, the touch line overlapping openings 30A are arranged such that each touch line overlapping opening 30A overlaps at least a part of each touch line 31. This arrangement reduces parasitic capacitance created between the touch line 31 and a touch electrode 30 not connected to the touch line 31, thus offering better sensitivity in position detection.

As shown in FIG. 2, on the inner surface side of the array substrate 21 making up the liquid crystal panel 11, the inner surface side being in the display area AA, thin-film transistors (TFTs) 23 (switching elements) and the pixel electrodes 24 are arranged. A number of the TFTs 23 and of the pixel electrodes 24 are arranged at intervals in the X-axis direction and the Y-axis direction to form a matrix pattern. Around these TFTs 23 and pixel electrodes 24, gate lines (scanning lines) 26 and source lines (signal lines or data lines) 27 are arranged such that the gate lines 26 and the source lines 27 intersect each other. The gate lines 26 substantially extend in the X-axis direction, while the source lines 27 substantially extend in the Y-axis direction. The gate lines 26 and the source lines 27 are connected to the gate electrodes 23A of the TFTs 23 and the source electrodes 23B of the TFTs 23, respectively, and the pixel electrodes 24 are connected to the drain electrodes 23C of the TFTs 23. The TFTs 23 are driven based on various signals supplied to the gate lines 26 and to the source lines 27, and the driven TFTs 23 control supply of voltage to the pixel electrodes 24. The TFTs 23 are located on the left-hand side or on the right-hand side relative to the pixel electrodes 24 (source lines 27) in the X-axis direction in FIG. 2. Rows of TFTs 23 located on the left-hand side relative to pixel electrodes 24 (source lines 27) and rows of TFTs 23 located on the right-hand side relative to pixel electrodes 24 (source lines 27) are arranged alternately in the Y-axis direction. The TFTs 23 are thus arranged in a zigzag pattern in a plan view. In its plane shape, each pixel electrode 24 is substantially a vertically elongated rectangle (with its long sides, specifically, bent along the source line 27). The pixel electrode 24 has short sides extending in the direction in which the gate line 26 extends and long sides extending in the direction in which the source line 27 extends. The pixel electrode 24 is sandwiched between a pair of gate lines 26 lying on both sides in the Y-axis direction and between a pair of source lines 27 lying on both sides in the X-axis direction. On the CF substrate 20 side, a shading portion (inter-pixel shading portion or black matrix) 29 is formed, which is indicated by two-dot chain lines in FIG. 2. In its plane shape, the shading portion 29 is substantially a latticed shape that partitions pixel electrodes 24 adjacent to each other, and has pixel openings 29A located such that, in a plan view, each pixel opening 29A overlaps most of each pixel electrode 24. These pixel openings 29A allow light passing through the pixel electrodes 24 to come out of the liquid crystal panel 11. The shading portion 29 is disposed such that, in a plan view, it overlaps at least the gate lines 26 and the source lines 27 (including the touch lines 31) on the array substrate 21 side. Arrangement of the TFTs 23 and the pixel electrodes 24 will be described later.

FIG. 3 is a sectional view of the vicinity of a central part of a pixel PX of the liquid crystal panel 11. As shown in FIG. 3, the liquid crystal panel 11 includes a liquid crystal layer (medium layer) 22 placed between the pair of substrates 20 and 21 and containing liquid crystal molecules, which are a substance that is changed in optical characteristics when exposed to an electric field. In the display area AA on the inner surface side of the CF substrate 20 making up the liquid crystal panel 11, color filters 28 of three colors, i.e., blue (B), green (G), and red (R) are arranged. A number of sets of color filters 28 of different colors are arranged repeatedly along the gate lines 26 (X-axis direction) and extend along the source lines 27 (extend substantially along the Y-axis direction). The color filters 28 as a whole are thus arranged in strip patterns. Each of the color filters 28 overlaps each of the pixel electrodes 24 on the array substrate 21 side in a plan view. A boundary (color boundary) between each pair of color filters 28 adjacent to each other and different in color from each other in the X-axis direction overlaps each source line 27 and the shading portion 29. In this liquid crystal panel 11, a set of color filters 28 of R, G, and B arranged in the X-axis direction and a set of three pixel electrodes 24 each counter to each of the color filters 28 make up a set of pixels PX of three colors. In the liquid crystal panel 11, a set of pixels PX of three colors R, G, and B adjacent to each other in the X-axis direction make up a display pixel that displays a given color tone. A pitch of arrangement of pixels PX in the X-axis direction is determined to be, for example, about 60 µm (specifically, 62 µm), and the same of pixels PX in the Y-axis direction is determined to be, for example, about 180 µm (specifically, 186 µm). The shading portion 29 is disposed in such a way as to partition adjacent color filters 28 from each other. On the upper layer side (side closer to the liquid crystal layer 22) to the color filters 28, a flattening layer (not depicted) is provided as a solid layer substantially covering the whole of the CF substrate 20. The innermost surfaces of the substrates 20 and 21, the innermost surfaces being in contact with the liquid crystal layer 22, are overlaid respectively with orientation films (not depicted) for orienting liquid crystal molecules included in the liquid crystal layer 22.

A common electrode 25 will then be described with reference to FIGS. 2 and 3. As shown in FIGS. 2 and 3, on the inner surface side of the array substrate 21 in the display area AA, the common electrode 25 is formed on the upper layer side to the pixel electrodes 24 such that the common electrode 25 overlaps all the pixel electrodes 24. The common electrode 25 is constantly supplied with a reference voltage of substantially a constant voltage level, except a period (sensing period) in which a touch signal (signal or position detection signal) is supplied and the input position of input made by the finger, which is the position input object, is detected, and extends to substantially cover the whole of the display area AA. On a part of common electrode 25 that overlaps each pixel electrode 24 (specifically, each pixel electrode body 24A, which will be descried later), pixel overlapping openings (pixel overlapping slits or orientation control slits) 25A are formed such that they extend in the direction of extension of the long sides of the pixel electrode 24. The number and shape of the pixel overlapping openings 25A and a range in which the pixel overlapping openings 25A are formed may be changed properly to be different from those indicated in FIGS. 2 and 3. When the pixel electrode 24 is charged to create a potential difference between the pixel electrode 24 and the common electrode 25 overlapping each other, a component acting along a plate surface of the array substrate 21 as well as a fringe field (oblique field) including a component acting in the direction of a normal to the plate surface of the array substrate 21 develops between the edges of the pixel overlapping openings 25A and the pixel electrode 24. This fringe field is used to control a state of orientation of liquid crystal molecules included in the liquid crystal layer 22. In other words, the liquid crystal panel 11 according to this embodiment operates in fringe field switching (FFS) mode. The common electrode 25 forms the above touch electrodes 30. In addition to the above pixel overlapping openings 25A, the common electrode 25 also has a partition opening (partition slit) 25B that partitions touch electrodes 30 adjacent to each other. The partition opening 25B is composed of portions traversing across the whole length of the common electrode 25 in the X-axis direction and portions traversing across the whole length of the common electrode 25 in the Y-axis direction, thus being formed substantially into a latticed shape as a whole in a plan view. The partition opening 25B thus divides the common electrode 25 into check patterns in a plan view, providing the touch electrodes 30 electrically independent of each other that make up the common electrode 25. The touch lines 31 connected to the touch electrodes 30 thus supply common signals (reference potential signals) related to the display function and touch signals related to the touch function, to the touch electrodes 30 at different points of time, that is, in a time-division manner. The common signals are transmitted to all the touch lines 31 at the same points of time, giving all the touch electrodes 30 a reference potential to cause them to function as the common electrode 25.

A configuration of the TFT 23 and that of the pixel electrode 24 will be described in detail, with reference to FIG. 4. FIG. 4 is an enlarged plan view of the vicinity of given TFTs 23 in the array substrate 21. As shown in FIG. 4, each TFT 23 is of a laterally elongated shape extending along the X-axis direction as a whole and is located below a pixel electrode 24 to be connected to the TFT 23 such that the TFT 23 is adjacent to the pixel electrode 24 in the Y-axis direction in FIG. 4. The TFT 23 has a gate electrode 23A formed of a part of a gate line 26, the part overlapping a source line 27. The gate electrode 23A is of a laterally elongated shape extending along the X-axis direction, drives the TFT 23 based on a scanning signal supplied to the gate line 26, thereby controls a current flowing between a source electrode 23B and a drain electrode 23C. The TFT 23 has the source electrode 23B formed of a part of the source line 27, the part overlapping the gate line 26. The source electrode 23B is located on one end side of the TFT 23 in the X-axis direction such that substantially the whole of the source electrode 23B overlaps the gate electrode 23A and that the source electrode 23B is connected to a channel 23D. The TFT 23 has the drain electrode 23C disposed in a location separated from the source electrode 23B across a gap, that is, located on the other end side of the TFT 23 in the X-axis direction. The drain electrode 23C substantially extends along the X-axis direction, and has one end overlapping the gate electrode 23A in a location counter to the source electrode 23B, the one end being connected to the channel 23D, and the other end connected to the pixel electrode 24.

As shown in FIG. 4, the pixel electrode 24 is composed of a pixel electrode body 24 of substantially a rectangle that overlaps a pixel opening 29A of the shading portion 29, and a contact 24B projecting from the pixel electrode body 24 toward the TFT 23 along the Y-axis direction. The contact 24B overlaps the other end of the drain electrode 23C, and the contact 24B and the other end of the drain electrode 23C that overlap each other are interconnected through a pixel contact hole CH1 bored on a first inter-layer insulating film 36. The gate line 26 has a cutout made by cutting out a part of gate line 26 that overlaps the contact 24B and the drain electrode 23C. This cutout is formed to reduce capacitance between the gate line 26 and the pixel electrode 24. The other end of the drain electrode 23C overlaps the gate line 26. This arrangement is made in order that even if the drain electrode 23C is shifted in position relative to the gate line 26 when the array substrate 21 is manufactured, it does not cause a change in capacitance between the gate line 26 and the drain electrode 23C (that is, capacitance between the gate line 26 and the pixel electrode 24). The TFT 23 has the channel 23D that overlaps the gate electrode 23A via a gate insulating film 33, which will be described later, and that is connected to the source electrode 23B and the drain electrode 23C. The channel 23D overlaps the gate electrode 23A, extends in the X-axis direction, and has one end connected to the source electrode 23B and the other end connected to the drain electrode 23C. When the TFT 23 is switched on based on a scanning signal supplied to the gate electrode 23A, an image signal (data signal) supplied to the source line 27 is sent from the source electrode 23B to the drain electrode 23C through the channel 23D made of a semiconductor film 34. As a result, the pixel electrode 24 is charged to have a potential based on the image signal. The common electrode 25 has a cutout made by cutting out a part of common electrode 25 that overlaps the channel 23D. This cutout is formed to suppress fluctuations in a leak current flowing between the source electrode 23B and the drain electrode 23C, the fluctuations in the leak current resulting from fluctuations in the potential of the common electrode 25 (touch electrode 30) that occur when the TFT 23 is off.

Various films stacked on the inner surface side of the array substrate 21 will be described with reference to FIG. 5. FIG. 5 is a sectional view of the vicinity of TFTs 23 of the liquid crystal panel 11. As shown in FIG. 5, the array substrate 21 includes a first metal film 32, the gate insulating film 33, a semiconductor film 34, a second metal film 35, the first inter-layer insulating film 36, a first transparent electrode film 37, a third metal film 38, a second inter-layer insulating film 39, and a second transparent electrode film 40 that are stacked in increasing order from the lower layer side (side closer to the glass substrate). Each of the first metal film 32, the second metal film 35, and the third metal film 38 is formed as a single film made of one metal material selected from copper, titanium, aluminum, molybdenum, and tungsten or as a stacked film or alloy made of metal materials of different kinds, thus having conductivity and shading property. The first metal film 32 makes up the gate lines 26 and the gate electrodes 23A of the TFTs 23. The second metal film 35 makes up the source lines 27 and the source electrodes 23B and drain electrodes 23C of the TFTs 23. The third metal film 38 makes up the touch lines 31 and the inter-line connections 41 (which will be described later). Each of the gate insulating film 33, the first inter-layer insulating film 36, and the second inter-layer insulating film 39 is made of an inorganic material, such as silicon nitride ($SiN_x$) and silicon oxide ($SiO_2$). The gate insulating film 33 keeps the first metal film 32, which is on the lower layer side to the gate insulating film 33, insulated from the semiconductor film 34 and the second metal film 35, which are on the upper layer side to the same. The first inter-layer insulating film 36 keeps the semiconductor film 34 and the second metal film 35, which are on the lower layer side to the first inter-layer insulating film 36, insulated from the first transparent electrode film 37 and the third metal film 38, which are on the upper layer side to the same. The second inter-layer insulating film 39 keeps the first transparent electrode film 37 and the third metal film 38, which are on the lower layer side to the second inter-layer insulating film 39, insulated from the second transparent electrode film 40, which is on the upper layer side to the same. The semiconductor film 34 is a thin film made of, for example, oxide semiconductor, amorphous silicon, and the like, and makes up the channels (semiconductor portions) 23D connected to the source electrodes 23B and drain electrodes 23C of the TFTs 23. The first transparent electrode film 37 and the second transparent electrode film 40 are made of a transparent electrode material, such as indium tin oxide (ITO) and indium zinc oxide (IZO). The first transparent electrode film 37 makes up the pixel electrodes 24. The first transparent electrode film 37 and the third metal film 38 are on the upper layer side to the first inter-layer insulating film 36 and are in the same layer. It can be said, therefore, that the pixel electrodes 24 formed of the first transparent electrode film 37 and the touch lines 31 and inter-line connections 41 formed of the third metal film 38 are in the same layer. The second transparent electrode film 40 makes up the common electrode 25 (touch electrodes 30). According to this embodiment, the touch lines 31 and the inter-line connections 41 are of a single-layer structure formed of the third metal film 38. The touch lines 31 and the inter-line connections 41, however, may be formed as a stacked layer structure formed of the first transparent electrode film 37 and the third metal film 38.

A configuration of the touch lines 31 in the display area AA will then be described, referring mainly to FIG. 5 and, when necessary, to FIG. 4. As shown in FIG. 5, the touch lines 31 are formed of the third metal film 38 and, in a plan view, overlap almost the whole of, i.e., most of the source lines 27 formed of the second metal film 35, via the first inter-layer insulating film 36. This arrangement, in comparison with arrangement in which the touch lines do not overlap the source lines 27, reduces a space for arranging the touch lines 31 and the source lines 27, and is therefore preferable as arrangement for improving an open-area percentage. In the display area AA, the touch lines 31 extend substantially along the Y-axis direction in parallel with the source lines 27, and are separated from but adjacent to a number of the pixel electrodes 24 in the X-axis direction, the pixel electrodes 24 being lined up along the Y-axis direction. In other words, both of the touch lines 31 and the source lines 27 overlapping them do not overlap the pixel electrodes 24. The touch lines 31 overlap all the source lines 27, and the number of the touch lines 31 provided matches the number of the source lines 27 provided. Each touch line 31 has a pad 31A that is connected to a touch electrode 30 to be connected to the touch line 31 in the display area AA. The pad 31A partially projects from a side edge of the touch line 31 along the X-axis direction, is located between a gate line 26 and a pixel electrode 24 in the Y-axis direction, and overlaps a part of the gate line 26 (see FIG. 4). The pad 31A and a part of the touch electrode 30 to be connected to the touch line 31, the part overlapping the pad 31A, are interconnected through a touch line contact hole CH2 bored on the second inter-layer insulating film 39.

Figure 6:
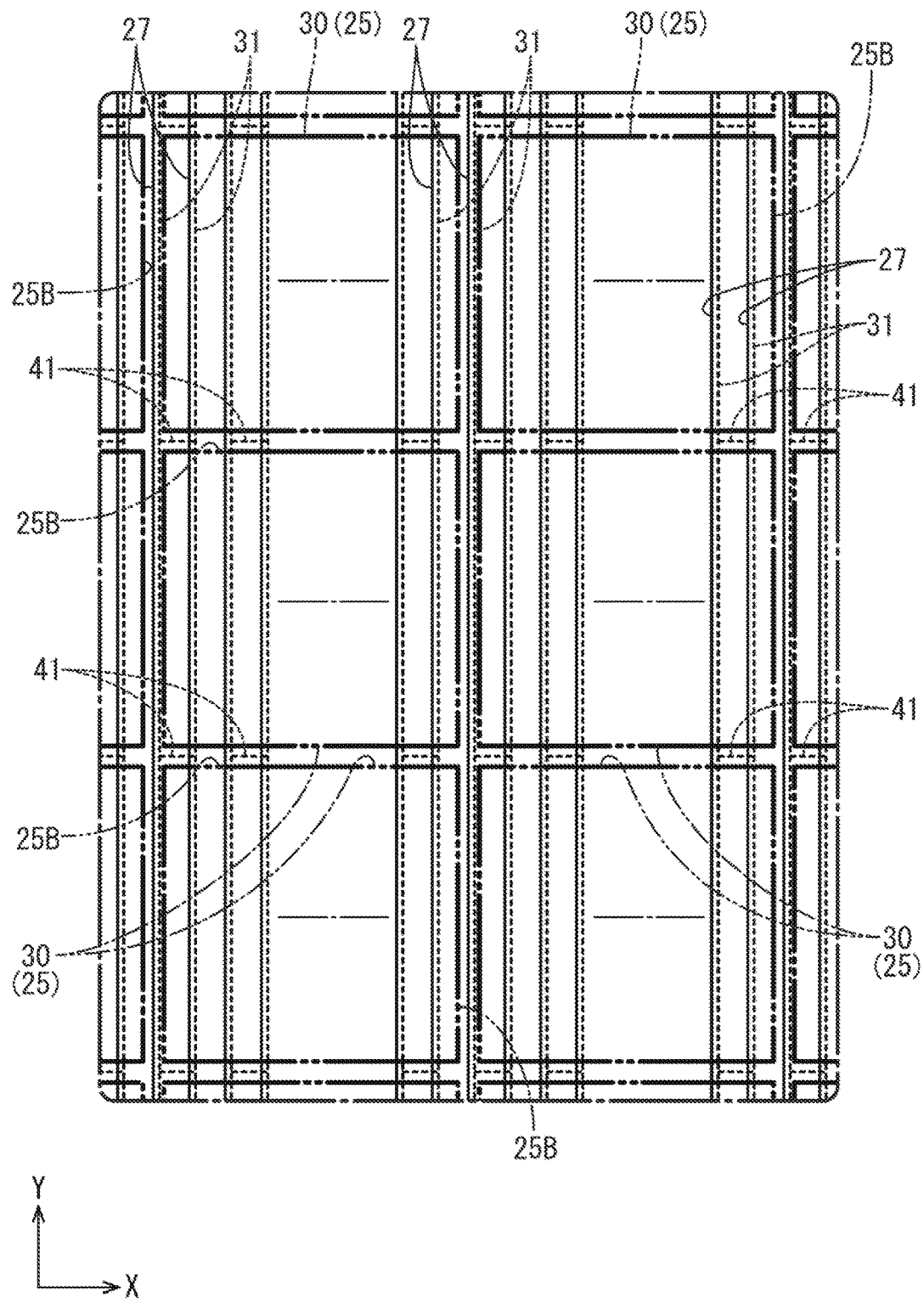
FIG. 6 is a plan view schematically showing arrangement of source lines, touch electrodes, touch lines, and inter-line connections in the liquid crystal panel.

According to this embodiment, as shown in FIG. 6, the inter-line connections 41 each interconnecting touch lines 31 adjacent to each other in the X-axis direction (which intersects (is perpendicular to) the direction of extension of the touch lines 31) are provided. The inter-line connections 41 allow repairing a broken source line 27 using a part of a touch line 31. FIG. 6 is a plan view schematically showing arrangement of the source lines 27, the touch electrodes 30, the touch lines 31, and the inter-line connections 41. In FIG. 6, the source lines 27 formed of the second metal film 35 are indicated by continuous lines, the touch lines 31 and inter-line connections 41 formed of the third metal film 38 are indicated by broken lines, and the touch electrodes 30 formed of the second transparent electrode film 40 are indicated by two-dot chain lines. Each inter-line connection 41 is connected to two touch lines 31 adjacent to each other across one pixel electrode 24 in the X-axis direction. Inter-line connections 41 are arranged at intervals in the Y-axis direction (direction of extension of the touch lines 31), and interconnect touch lines 31 to be connected to each other at several spots on the touch lines 31, the spots being separated across intervals in the Y-axis direction. Two touch lines 31 to be interconnected through inter-line connections 41 are connected in common to the same touch electrode 30. In other words, two touch lines 31 connected to the same touch electrode 30 are adjacent to each other across one pixel electrode 24 in the X-axis direction and are interconnected through inter-line connections 41. A touch signal and a common signal supplied to the touch electrode 30 are, therefore, transmitted through two touch lines 31 that are interconnected through the inter-line connections 41 to be put in a short-circuited state. This allows signal transmission under low wiring resistance, in which case a voltage drop hardly occurs. The inter-line connections 41 are located selectively between touch electrodes 30 adjacent to each other in the Y-axis direction such that most of the inter-line connections 41 does not overlap the touch electrodes 30, and therefore include no inter-line connection 41 most of which overlaps the touch electrodes 30. A pitch of arrangement of the inter-line connections 41 in the Y-axis direction is, therefore, equal to the length of one side of the touch electrode 30.

Figure 7:
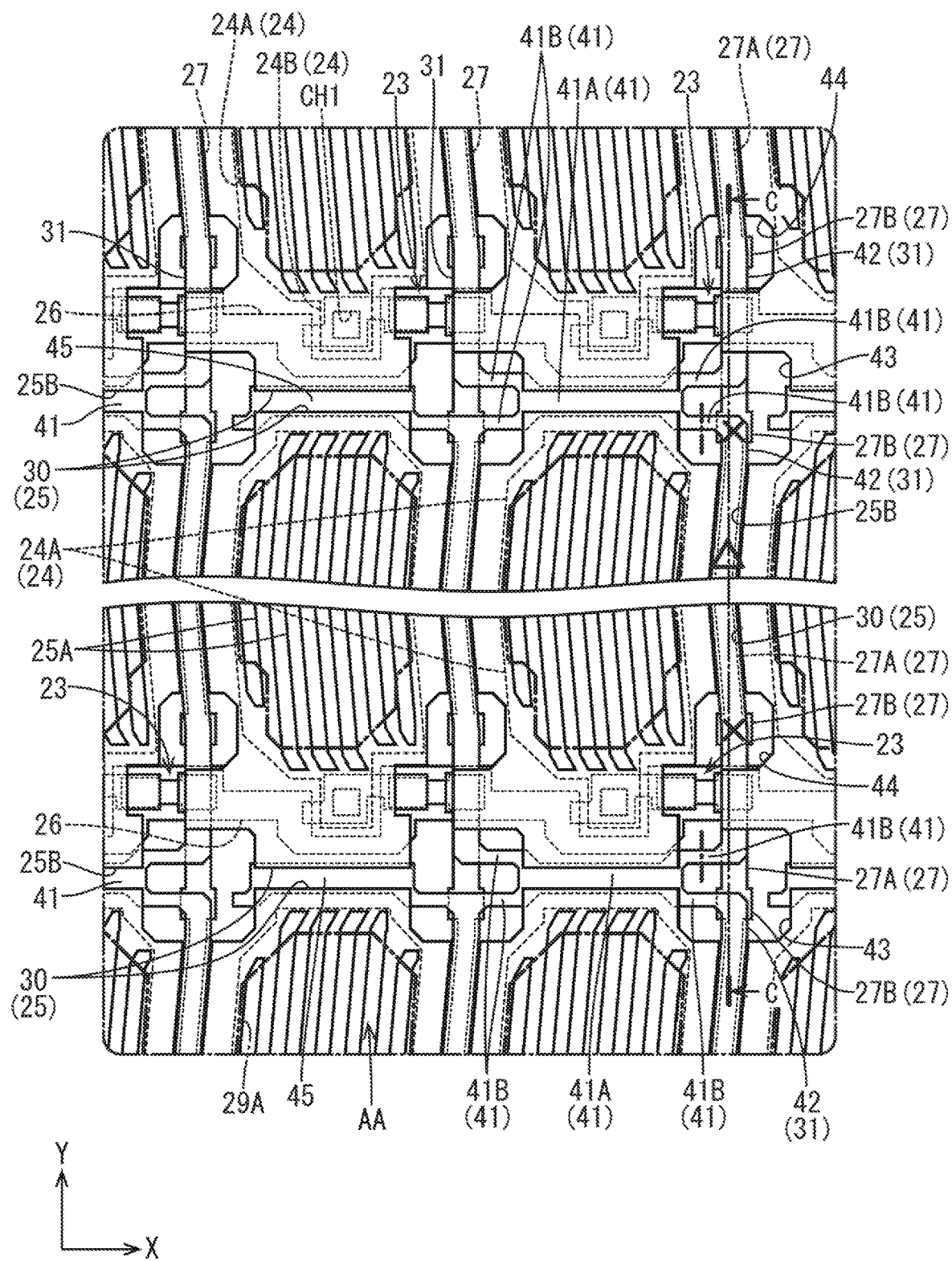
FIG. 7 is a plan view of the vicinity of two inter-line connections sandwiching one touch electrode therebetween in the array substrate and the CF substrate.

FIG. 7 is a plan view of the vicinity of two inter-line connections 41 that sandwiches one touch electrode 30 therebetween in the CF substrate 20 and the array substrate 21. The inter-line connections 41 are formed of the third metal film 38 as the touch lines 31 are. As shown in FIG. 7, most of the inter-line connection 41 overlaps a part of a partition opening 25B of the common electrode 25 formed of the second transparent electrode film 40, the part of the partition opening 25B partitioning touch electrodes 30 adjacent to each other in the Y-axis direction and extending in the X-axis direction. It is not the whole of the inter-line connection 41 that does not overlap the touch electrodes 30, but a small part (both side edges) of the inter-line connection 41 overlaps the touch electrodes 30. In the Y-axis direction, the inter-line connection 41 is sandwiched between a gate line 26 and a pixel electrode 24 (on the lower side in FIG. 7) opposite to a pixel electrode 24 connected to the gate line 26 via a TFT 23. The inter-line connection 41 extends along the X-axis direction, has both ends connected respectively to touch lines 31, and has a length equal to a pitch of arrangement of the pixels PX in the X-axis direction. The inter-line connection 41 is composed of a first connection portion 41A, which is located in the center of the inter-line connection 41 in its length direction (X-axis direction), and second connection portions 41B, which are located on both ends in the length direction. The first connection portion 41A is located at the midpoint between touch electrodes 30 adjacent to each other in the Y-axis direction, and has a width larger than the width of each of the second connection portions 41B. The second connection portions 41B connect the first connection portion 41A to the touch lines 31, and each have the width smaller than the width of the first connection portion 41A. Specifically, pairs of the second connection portions 41B are connected respectively to both ends of the first connection portion 41A in its length direction. Thus, four second connection portions 41B in total make up the inter-line connection 41. To put it in another way, the inter-line connection 41 has both ends in its length direction branched into two parts and connected to the touch lines 31, respectively. Two second connection portions 41B connected to each of both ends of the first connection portion 41A are lined up across a gap in the Y-axis direction.

A configuration of a source line 27 overlapping a touch line 31 will be described in detail with reference to FIG. 7. As shown in FIG. 7, the source line 27 is composed of a line body 27A extending along the Y-axis direction, and wider portions 27B located on middle parts of the line body 27A and wider than the line body 27A. Each wider portion 27B is located on a boundary between a part of line body 27A that is adjacent to a pixel electrode 24 and a part of line body 27A that traverses a TFT 23. In other words, each set of two wider portions 27B are disposed at a location at which the two wider portion 27B sandwich each TFT 23 therebetween in the Y-axis direction. Among the two wider portions 27B sandwiching the TFT 23 therebetween in the Y-axis direction, the wider portion 27B located closer to an inter-line connection 41 relative to the TFT 23 in the Y-axis direction overlaps a spot at which a second connection portion 41B located more distant from the TFT 23 among two second connection portions 41B lined up in the Y-axis direction is connected to a touch line 31. Among the two wider portions 27B sandwiching the TFT 23 therebetween in the Y-axis direction, in contrast, the wider portion 27B located opposite to the inter-line connection 41 side relative to the TFT 23 in the Y-axis direction is closer to the TFT 23 than the wider portion 27B located closer to the inter-line connection 41. Each wider portion 27B is of a square in a plan view and is a widest portion of the source line 27. The part of line body 27A that is adjacent to the pixel electrode 24 is slightly wider than the part of line body 27A that traverse the TFT 23.

Figure 8:
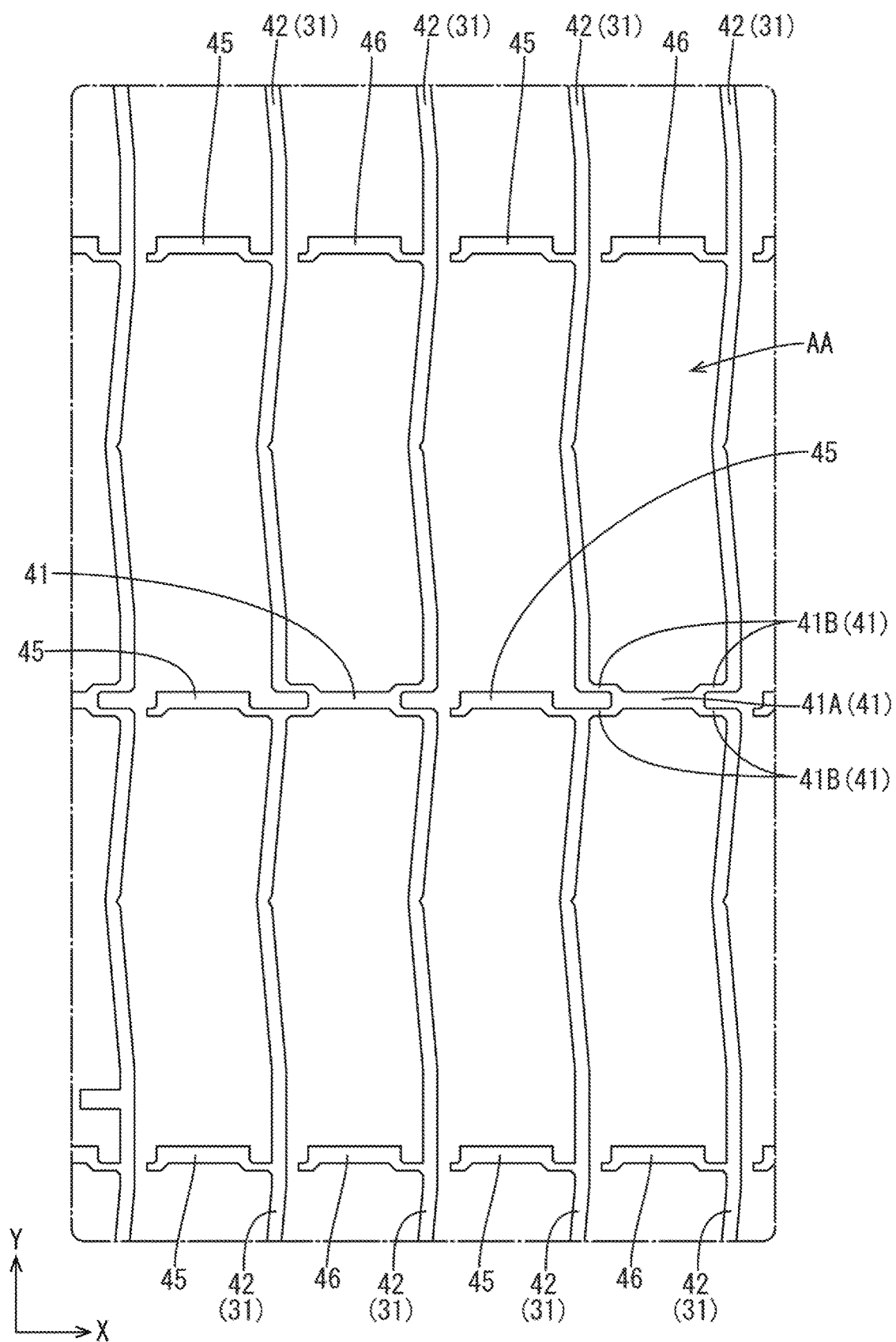
FIG. 8 is a plan view of a pattern of a third metal film included in the array substrate.

A configuration of the touch line 31 overlapping the source line 27 will then be described in detail, referring mainly to FIG. 8. FIG. 8 is a plan view of a pattern of the third metal film 38 included in the array substrate 21. As shown in FIG. 8, the touch lines 31 are made up of divided touch lines (divided lines) 42 sandwiching the inter-line connections 41 therebetween in the Y-axis direction. As shown in FIGS. 2 and 8, each divided touch line 42 extends along the Y-axis direction and has both ends in its length direction connected respectively to two inter-line connections 41 sandwiching a touch electrode 30 therebetween in the Y-axis direction. The divided touch line 42 thus has a length equal to the pitch of arrangement of the inter-line connections 41 in the Y-axis direction and to the length of one side of the touch electrode 30. The divided touch line 42 has a width that is substantially constant across the whole length of the divided touch line 42 and that is substantially equal to the width of the part of line body 27A of the source line 27 that traverse the TFT 23. The wider portion 27B of the source line 27 is therefore wider than the divided touch line 42, and parts of the wider portion 27B project laterally from both side edges of the divided touch line 42, respectively. Two divided touch lines 42 sandwiching an inter-line connection 41 therebetween in the Y-axis direction are connected respectively to two second connection portions 41B making up the sandwiched inter-line connection 41 and adjacent to each other in the Y-axis direction. It can be said, therefore, that the inter-line connection 41 has the function of interconnecting two touch lines 31 adjacent to each other in the X-axis direction and further has a function of interconnecting two divided touch lines 42 making up the touch line 31 and adjacent to each other in the Y-axis direction.

Figure 9:
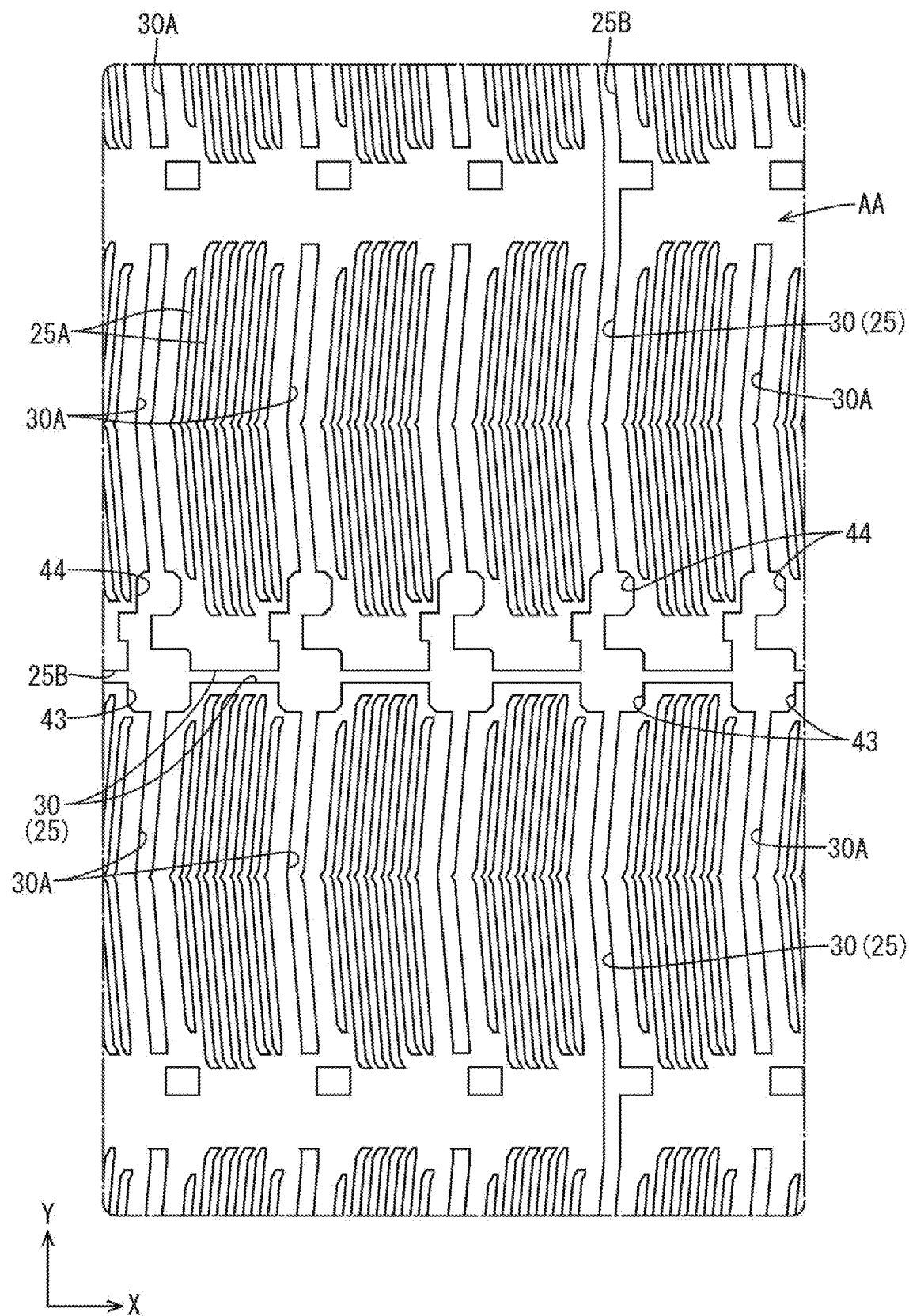
FIG. 9 is a plan view of a pattern of a second transparent electrode film included in the array substrate.
Figure 10:
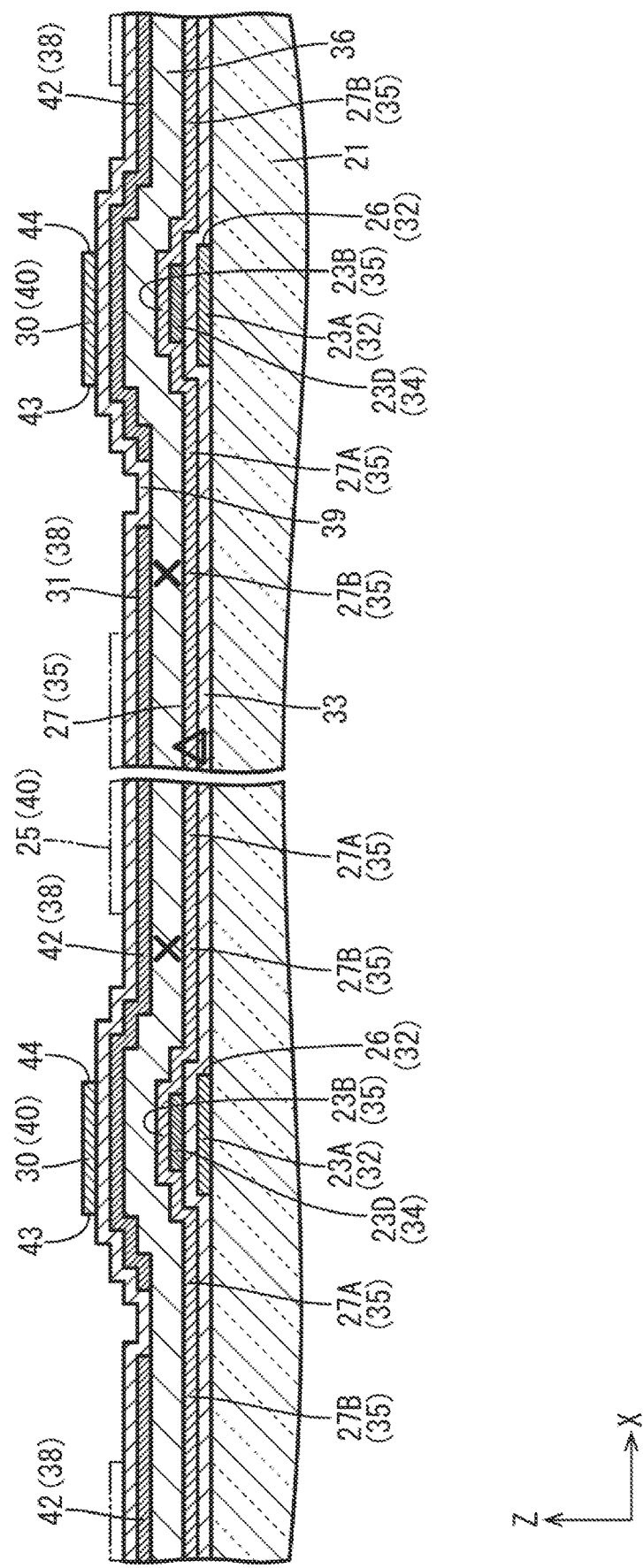
FIG. 10 is a sectional view of the array substrate of FIG. 7 that is taken along a C-C line in FIG. 7.

A configuration of the touch electrode 30 related to the source line 27 and the touch line 31 described above will then be described in detail, referring mainly to FIG. 9. FIG. 9 is a plan view of a pattern of the second transparent electrode film 40 included in the array substrate 21. As shown in FIG. 9, the touch electrode 30 has first openings 43 and second openings 44. As shown in FIGS. 2 and 9, the first openings 43 is each formed in such a way as to roughly encircle each set of two second connection portions 41B making up the inter-line connection 41 and adjacent to each other in the Y-axis direction. The first openings 43 are therefore arranged such that a pitch of arrangement of the first openings 43 in the X-axis direction is equal to the length of the inter-line connection 41 and that a pitch of arrangement of the first openings 43 in the Y-axis direction is equal to the pitch of arrangement of the inter-line connections 41 in the Y-axis direction. More specifically, each first opening 43 is of a square in a plan view and is formed in such a way as to have an outline encircling not only the set of two second connection portions 41B adjacent to each other in the Y-axis direction but also the wider portion 27B located closer to the inter-line connection 41 relative to the TFT 23 in the Y-axis direction among the two wider portions 27B sandwiching the TFT 23 therebetween in the Y-axis direction. Each first opening 43 communicates with a part of partition opening 25B of the common electrode 25 that extends in the X-axis direction and with a cutout of touch electrode 30 that overlaps the channel 23D of the TFT 23. The first openings 43 include a group of first openings 43 each communicating with a part of each partition opening 25B that extends in the Y-axis direction and a group of first openings 43 each communicating with each touch line overlapping opening 30A. The second opening 44 is formed in such a way as to encircle the wider portion 27B located opposite to the inter-line connection 41 side relative to the TFT 23 in the Y-axis direction among the two wider portions 27B sandwiching the TFT 23 therebetween in the Y-axis direction. The second opening 44 communicates with the cutout of touch electrode 30 that overlaps the channel 23D of the TFT 23, and is adjacent to the cutout on the opposite side to the first opening 43 with respect to the cutout in the Y-axis direction. The second opening 44 communicates also with the touch line overlapping opening 30A.

As shown in FIGS. 2 and 8, the touch lines 31 lined up adjacent to each other repeatedly in the X-axis direction include pairs interconnected through the inter-line connections 41 and pairs not interconnected. Specifically, a set of two touch lines 31 adjacent to each other in the X-axis direction and connected in common to the same touch electrode 30 are interconnected through an inter-line connection 41, while a set of two touch lines 31 adjacent to each other in the X-axis direction but connected respectively to different touch electrodes 30 are not interconnected through an inter-line connection 41. Either of such a set of two touch lines 31 that are not interconnected has first dummy connection portions (dummy connection portions) 45. Each first dummy connection portion 45 is sandwiched between a gate line 26 and a pixel electrode 24 (lower side in FIGS. 2 and 8) opposite to a pixel electrode 24 connected to the gate line 26 via a TFT 23 in the Y-axis direction. This means that a positional relation of the first dummy connection portion 45 to the pixel electrode 24 and the gate line 26 in the Y-axis direction is equal to a positional relation of the inter-line connection 41 to the pixel electrode 24 and the gate line 26 in the Y-axis direction. Similar to the inter-line connection 41, the first dummy connection portion 45 has a wider portion and a narrower portion connected to the wider portion and the touch line 31. In this configuration, parasitic capacitance created at a pixel electrode 24 with the inter-line connection 41 sandwiched between the pixel electrode 24 and the gate lined 26 becomes equal to parasitic capacitance created at a pixel electrode 24 with the first dummy connection portion 45 sandwiched between the pixel electrode 24 and the gate lined 26. This ensures that display irregularity hardly occurs. The first dummy connection portions 45 are arranged such that a series of the pixel electrode 24, the first dummy connection portion 45, and the gate line 26 appear repeatedly in the Y-axis direction. A pitch of arrangement of the first dummy connection portions 45 in the Y-axis direction is equal to that of the pixels PX in the Y-axis direction, and the number of the first dummy connection portions 45 making up a row in the Y-axis direction is substantially equal to the number of the pixels PX making up a row in the Y-axis direction and to the number of the gate lines 26 making up a row in the Y-axis direction. In this manner, it is ensured that a maximum number of the first dummy connection portions 45 are provided. This further ensures that display irregularity hardly occurs. As shown in FIGS. 2 and 9, a first opening 43 formed on a touch electrode 30 encircles a spot at which a first dummy connection portion 45 among the first dummy connection portions 45, the first dummy connection portion 45 being disposed on the same line on which an inter-line connection 41 is disposed, is connected to a touch line 31.

As shown in FIGS. 2 and 8, either of a set of two touch lines 31 adjacent to each other and connected in common to the same touch electrode 30 has second dummy connection portions (electrode overlapping dummy connection portions) 46. The second dummy connection portions 46 are arranged in the same columns in which the inter-line connections 41 are arranged. Different from the inter-line connection 41 most of which does not overlap the touch electrode 30, each second dummy connection portion 46 as a whole overlaps the touch electrode 30. The second dummy connection portion 46 is sandwiched between a gate line 26 and a pixel electrode 24 (lower side in FIGS. 2 and 8) opposite to a pixel electrode 24 connected to the gate line 26 via a TFT 23 in the Y-axis direction. This means that a positional relation of the second dummy connection portion 46 to the pixel electrode 24 and the gate line 26 in the Y-axis direction is equal to a positional relation of the inter-line connection 41 and the first dummy connection portion 45 to the pixel electrode 24 and the gate line 26 in the Y-axis direction. Similar to the inter-line connection 41 and the first dummy connection portion 45, the second dummy connection portion 46 has a wider portion and a narrower portion connected to the wider portion and the touch line 31. In this configuration, parasitic capacitance created at a pixel electrode 24 with the inter-line connection 41 sandwiched between the pixel electrode 24 and the gate lined 26, parasitic capacitance created at a pixel electrode 24 with the first dummy connection portion 45 sandwiched between the pixel electrode 24 and the gate lined 26, and parasitic capacitance created at a pixel electrode 24 with the second dummy connection portion 46 sandwiched between the pixel electrode 24 and the gate lined 26 become equal to each other. This further ensures that display irregularity hardly occurs. In an area overlapping the touch electrode 30 (area sandwiched between two inter-line connections 41 separated from each other in the Y-axis direction), the second dummy connection portions 46 are arranged such that a series of the pixel electrodes 24, the second dummy connection portion 45, and the gate line 26 appear repeatedly in the Y-axis direction. A pitch of arrangement of the second dummy connection portions 46 in the Y-axis direction is equal to that of the pixels PX in the Y-axis direction, and the number of the second dummy connection portions 46 making up a row in the Y-axis direction is substantially equal to the number of the pixels PX making up a row in the Y-axis direction and to the number of the gate lines 26 making up a row in the Y-axis direction. In this manner, it is ensured that a maximum number of the second dummy connection portions 46 are provided. This further ensures that display irregularity hardly occurs. Because the second dummy connection portion 46 overlapping the touch electrode 30 is sandwiched between the gate line 26 and the pixel electrode 24, the second dummy connection portion 46 blocks an electric field that could be created between the gate line 26 and the pixel electrode 24 or between the gate line 26 and the touch electrode 30. In the same manner, the first dummy connection portion 45 located to overlap the touch electrode 30 blocks an electric field that could be created between the gate line 26 and the pixel electrode 24 or between the gate line 26 and the touch electrode 30.

In the above configuration, when a source line 27 is broken, a touch line 31 overlapping the broken source line 27 is used to repair the broken source line 27. Wire-breaking repair work will be described specifically with reference to FIGS. 7 and 10. FIG. 10 is a sectional view of the vicinity of spots at which a touch line 30 is connected to two inter-line connections 41. When a source line 27 extending in the Y-axis direction is broken at its given spot, by identifying the broken spot as shown in FIGS. 7 and 10, two inter-line connections 41 that sandwich the broken spot therebetween in the Y-axis direction can be identified among inter-line connections 41 connected to a touch line 31 overlapping the broken source line 27. In FIGS. 7 and 10, the broken spot of the source line 27 is indicated by "Δ". Out of four second connection portions 41B that are two pairs of second connection portions 41B making up the identified two inter-line connections 41, respectively, and are connected to the touch line 31 overlapping the broken source line 27, two second connection portions 41B connected to a divided touch line 42 overlapping the broken spot are exposed to a laser beam. These two second connection portions 41B exposed to the laser beam are thus cut away to electrically isolate the divided touch line 42 overlapping the broken spot from the two inter-line connections 41 and from other divided touch lines 42. This process is carried out as two cycles of cut work by which the divided touch line 42 overlapping the broken spot is electrically isolated, and offers superior work efficiency. In FIG. 7, spots at which the second connection portions 41B are cut by laser beam emission are indicated by thick single-dot chain lines. Because each second connection portion 41B cut by laser beam emission is narrower than the first connection portions 41A, the second connection portion 41B can be used as a mark to be hit by the laser beam and, being cut in a shorter time, it reduces a time required for cut work. This makes the cut process more efficient. In addition, since the touch electrode 30 has the first opening 43 encircling the second connection portion 41B, the laser beam emitted toward the second connection portion 41B travels through the first opening 43. This prevents a case where the laser beam is emitted onto the touch electrode 30, thus preventing such a secondary problem that the laser beam destroys the touch electrode 30 and that debris of the destroyed touch electrode 30 scatter into the liquid crystal layer 22 to short-circuit other lines and electrodes.

Meanwhile, two wider portions 27B making up the broken source line 27, the two wider portions 27B sandwiching the broken spot therebetween in the Y-axis direction, are also exposed to a laser beam. As a result, at spots exposed to the laser beam, the first inter-layer insulating film 36 interposed between the source line 27 and the touch line 31 is destroyed to lose its insulation property. This short-circuits the source line 27 and the divided touch line 42 overlapping the broken spot at two spots between which the broken spot is sandwiched in the Y-axis direction. In FIGS. 7 and 10, these spots exposed to the laser beam for short-circuiting are indicated by "x". Through this process, the divided touch line 42, which makes up the touch line 31 overlapping the broken source line 27 and overlaps the broken spot, is short-circuited to the source line 27, as a section of the divided touch line 42 that lies astride the broken spot, and is electrically isolated from other divided touch lines 42 (which do not overlap the broken spot) making up the touch line 31 overlapping the broken source line 27. An image signal thus travels through the above divided touch line 42 to bypass the broken spot of the source line 27 and reaches the pixel electrode 24. A touch signal or common single originally transmitted through the touch line 31 of which the divided touch line 42 overlapping the broken spot is used for repair of the source line 27 is transmitted through another touch line 31 connected to the above touch line 31 through inter-line connections 41. This means that even if a part of the touch line 31 is used for repairing the broken source line 27, signal supply to the touch electrode 30 to be connected to the touch line 31 can be maintained. In addition, because the touch line 31 does not overlap the pixel electrode 24, erroneous emission of a laser beam onto the pixel electrode 24 can be avoided in the process of emitting the laser beam to short-circuit the touch line 31 and the source line 27. This prevents such a secondary problem that the laser beam destroys the pixel electrode 24 and that debris of the destroyed pixel electrode 24 scatter into the liquid crystal layer 22 to short-circuit other lines and electrodes. In the process of emitting the laser beam to short-circuit the touch line 31 and the source line 27, the wider portions 27B each wider than the line body 27A of the source line 27 serve as marks to be hit by the laser beam, thus offering superior work efficiency. In addition, the touch electrode 30 has the first opening 43 and second opening 44 encircling each wider portion 27B. This causes the laser beam emitted toward the wider portion 27B to travel through the first opening 43 and second opening 44, preventing a case where the laser beam is emitted onto the touch electrode 30, thus preventing such a secondary problem that the laser beam destroys the touch electrode 30 and that debris of the destroyed touch electrode 30 scatter into the liquid crystal layer 22 to short-circuit other lines and electrodes.

As described above, the liquid crystal panel (display device) 11 according to this embodiment includes the pixel electrodes 24, the source lines (signal lines) 27 that supply image signals to the pixel electrodes 24, the touch lines (lines) 31 arranged such that at least they partly overlap the source lines 27, respectively, via the first inter-layer insulating film (insulating film) 36 but do not overlap the pixel electrodes 24, and the inter-line connections 41 interconnecting the touch lines 31, the inter-line connections 41 being arranged at intervals in the direction of extension of the touch lines 31.

Each pixel electrode 24 comes to have a potential based on an image signal supplied from a source line 27. The touch lines 31 at least partly overlap the source lines 27, respectively, via the first inter-layer insulating film 36, and are interconnected through the inter-line connections 41 arranged at intervals in the direction of extension of the touch lines 31. According to this configuration, when any one of the source lines 27 is broken, the broken source line 27 can be repaired using a touch line 31 overlapping the broken source line 27.

In repair work, a laser beam is emitted onto two spots of the touch line 31 overlapping the broken source line 27 via the first inter-layer insulating film 36, the two spots sandwiching a broken spot of the source line 27 therebetween in the direction of extension of the touch line 31, to short-circuit the touch line 31 and the broken source line 27. Meanwhile, to electrically isolate a section of the touch line 31 overlapping the broken source line 27, the section being connected to two inter-line connections 41 sandwiching the broken spot of the source line 27 therebetween in the direction of extension of the source line 27, from the touch line 31, the touch line 31 and the inter-line connections 41 connected thereto are cut properly. Through this process, this section of the touch line 31 overlapping the broken source line 27 is short-circuited to the source line 27, as the section that lies astride the broken spot, and is electrically isolated from the other part of the touch line 31 overlapping the broken source line 27. As a result, an image signal travels through the above section of the touch line 31 to bypass the broken spot of the source line 27 and reaches the pixel electrode 24. A signal originally transmitted through the touch line 31 a part of which is used for repair of the source line 27 is transmitted through another touch line 31 connected to the above touch line 31 through inter-line connections 41.

The above arrangement in which the touch line 31 at least partly overlaps the source line 27, in comparison with an arrangement in which the touch line 31 does not overlap the source line 27, reduces a space for arranging the touch line 31 and the source line 27, and is therefore preferable as the arrangement for improving the open-area percentage. The arrangement also leads to an improvement in a degree of freedom in determining the location of a spot where the touch line 31 and the source line 27 are short-circuited. In addition, because the touch line 31 does not overlap the pixel electrode 24, when a process of laser beam emission or the like is carried out to short-circuit the touch line 31 and the source line 27, the process hardly affects the pixel electrode 24. A secondary problem caused by the process of laser beam emission or the like, therefore, hardly occurs. When wire-breaking repair is not carried out, the touch lines 31 are kept interconnected through the inter-line connections 41. This reduces wiring resistance.

The liquid crystal panel 11 includes also the common electrode 25 disposed such that at least it partially overlaps the pixel electrodes 24 via the second inter-layer insulating film (insulating film) 39, and the touch electrodes (position detection electrodes) 30 formed by dividing the common electrode 25, each touch electrode 30 creating capacitance between the touch electrode 30 and a position input object by which position input is made and detecting the position of input made by the position input object. The touch lines 31 are connected to the touch electrodes 30, and supply position detection signals and common signals, which give the touch electrodes 30 the reference voltages, at different points of time. In this configuration, a potential difference based on an image signal supplied from a source line 27 to a pixel electrode 24 is created between the pixel electrode 24 and the common electrode 25 at least partially overlapping the pixel electrode 24 via the second inter-layer insulating film 39, and an image is displayed using this potential difference. Each of the touch electrodes 30, which are formed by dividing the common electrode 25, creates capacitance between the touch electrode 30 and the position input object by which position input is made and detects the position of input made by the position input object. Each touch line 31 supplies a position detection signal and a common signal, which gives the touch electrode 30 the reference potential, to the touch electrode 30 connected to the touch line 31 in a time-division manner, thereby allows the liquid crystal panel 11 to exert the above-mentioned position detection function and the image display function.

Out of the touch lines 31, a group of touch lines 31 interconnected through inter-line connections 41 are connected in common to the same touch electrode 30. According to this configuration, even if a part of a touch line 31 included in the group of touch lines 31 is used for repair of a broken source line 27, a position detection signal or a common signal can be supplied to the same touch electrode 30 for common connection through another touch line 31 connected to the above touch line 31 through the inter-line connections 41.

Of the source line 27 and the touch line 31, the source line 27 is composed of the line body 27A and the wider portions 27B each wider than the line body 27A. In this configuration, when the touch line 31 and the broken source line 27 are short-circuited to repair the broken source line 27, the process of laser beam emission or the like can be carried out using the wider portions 27B each wider than the line body 27A, as marks. This makes the process more efficient in workability.

The touch electrode 30 has the opening encircling the wider portion 27B. In this configuration, when the process of emitting a laser beam onto the wider portion 27B is carried out to repair the broken source line 27, the process hardly affects the touch electrode 30. A secondary problem caused by laser beam emission or the like, therefore, hardly occurs.

The inter-line connection 41 is composed of the first connection portion 41A and the second connection portions 41B which connect the first connection portion 41A to the touch line 31 and each of which is narrower than the first connection portion 41A. In this configuration, when the touch line 31 or the inter-line connection 41 connected to the touch line 31 is cut to repair the broken source line 27, the process of laser beam emission or the like is carried out using the second connection portions 41B each narrower than the first connection portion 41A, as marks. Because the second connection portion 41B is narrower than the first connection portion 41A, cutting the second connection portion 41B requires a shorter time. This makes the process efficient in workability.

The touch electrode 30 has the opening encircling the second connection portions 41B. In this configuration, when the process of emitting a laser beam onto the second connection portions 41B is carried out to repair the broken source line 27, the process hardly affects the touch electrode 30. A secondary problem caused by laser beam emission or the like, therefore, hardly occurs.

The touch line 31 is composed of the divided touch lines (divided lines) 42 sandwiching the inter-line connections 41 therebetween in the direction of extension of the touch line 31. The second connection portions 41B are arranged such that two second connection portions 41B are connected respectively to two divided touch lines 42 adjacent to an inter-line connection 41 in the direction of extension of the divided touch lines 42. In this configuration, the inter-line connection 41 has the function of interconnecting touch lines 31 and has also the function of interconnecting divided touch lines 42 making up the touch line 31. When the process of cutting the second connection portions 41B is carried out to repair the broken source line 27, the process electrically isolates a specific divided touch line 42 from other divided touch lines 42 and electrically isolates also the touch line 31 including the specific divided touch line 42 from other touch lines 31. In this case, in comparison with the case where the inter-line connection 41 has only the function of interconnecting touch lines 31, a fewer number of times of cutting process is required. This makes the process more efficient in workability.

The touch electrodes 30 are arranged at intervals, and the inter-line connections 41 are each selectively disposed between touch electrodes 30 adjacent to each other such that each inter-line connection 41 does not overlap each touch line 30. In this configuration, because the inter-line connections 41 include no inter-line connection 41 that overlaps the touch electrode 30, when the process of cutting the inter-line connection 41 by a laser beam is carried out to repair the broken source line 27, the process hardly affects the touch electrode 30. A secondary problem caused by laser beam emission or the like, therefore, hardly occurs. If, for example, an opening is formed on a part of touch electrode 30 that overlaps the inter-line connection 41 to avoid the above secondary problem, it may pose a problem that the area of the touch electrode 30 is reduced by the portion corresponding to the opening. Such a problem, however, can be avoided in this configuration.

The liquid crystal panel 11 includes the gate lines (scanning lines) 26 extending in such away as to intersect the source lines 27 and the touch lines 31, the gate lines 26 being arranged at intervals such that they at least sandwich the pixel electrodes 24 therebetween. The inter-line connections 41 are each sandwiched between a pixel electrode 24 and a gate line 26 and each have a second dummy connection portion (electrode overlapping dummy connection portion) 46 which is connected to a touch line 31, overlaps a touch electrode 30, and is sandwiched between a pixel electrode 24 and a gate line 26. In this configuration, the second dummy connection portion 46, which is connected to the touch line 31 as the inter-line connection 41 is, has the same positional relation to the gate line 26 and the pixel electrode 24 as the inter-line connection 41 has. As a result, parasitic capacitance created at the pixel electrode 24 with the inter-line connection 41 sandwiched between the pixel electrode 24 and the gate line 26 becomes equal to parasitic capacitance created at the pixel electrode 24 with the second dummy connection portion 46 sandwiched between the pixel electrode 24 and the gate line 26. This ensures that display irregularity hardly occurs. In addition, because the second dummy connection portion 46 overlapping the touch electrode 30 is sandwiched between the gate line 26 and the pixel electrode 24, the second dummy connection portion 46 blocks an electric field that could be created between the gate line 26 and the pixel electrode 24 or between the gate line 26 and the touch electrode 30.

The liquid crystal panel 11 includes the gate lines 26 extending in such a way as to intersect the source lines 27 and the touch lines 31, the gate lines 26 being arranged at intervals such that they at least sandwich the pixel electrodes 24 therebetween. The inter-line connections 41 are each sandwiched between a pixel electrode 24 and a gate line 26. The touch lines 31 include pairs of touch lines 31 adjacent to each other and interconnected through inter-line connections 41 and pairs of touch lines 31 adjacent to each other but not interconnected, and have first dummy connection portions (dummy connection portions) 45 which are connected to either of each pair of touch lines 31 adjacent to each other but not interconnected and are each sandwiched between a pixel electrode 24 and a gate line 26. In this configuration, the first dummy connection portion 45, which is connected to the touch line 31 as the inter-line connection 41 is, has the same positional relation to the gate line 26 and the pixel electrode 24 as the inter-line connection 41 has. As a result, parasitic capacitance created at the pixel electrode 24 with the inter-line connection 41 sandwiched between the pixel electrode 24 and the gate line 26 becomes equal to parasitic capacitance created at the pixel electrode 24 with the first dummy connection portion 45 sandwiched between the pixel electrode 24 and the gate line 26. This ensures that display irregularity hardly occurs.

The first dummy connection portions 45 are arranged such that a series of the pixel electrodes 24, the first dummy connection portions 45, and the gate lines 26 appears repeatedly in the direction of extension of the source lines 27. In this configuration, the maximum number of the first dummy connection portions 45 provided, the first dummy connection portions 45 each sandwiched between the pixel electrode 24 and the gate line 26, is ensured. This further ensures that display irregularity hardly occurs. The first dummy connection portions 45 include a group of first dummy connection portions overlapping the touch electrodes 30. Such first dummy connection portions 45 block an electric field that could be created between the gate line 26 and the pixel electrode 24 or between the gate line 26 and the touch electrode 30.

Second Embodiment

A second embodiment will be described with reference to FIGS. 11 to 13. In the second embodiment, an inter-line connection 141 provided by changing the configuration of the inter-line connection 141 of the first embodiment will be described. The same structure and effects as described in the first embodiment will not be described repeatedly.

Figure 11:
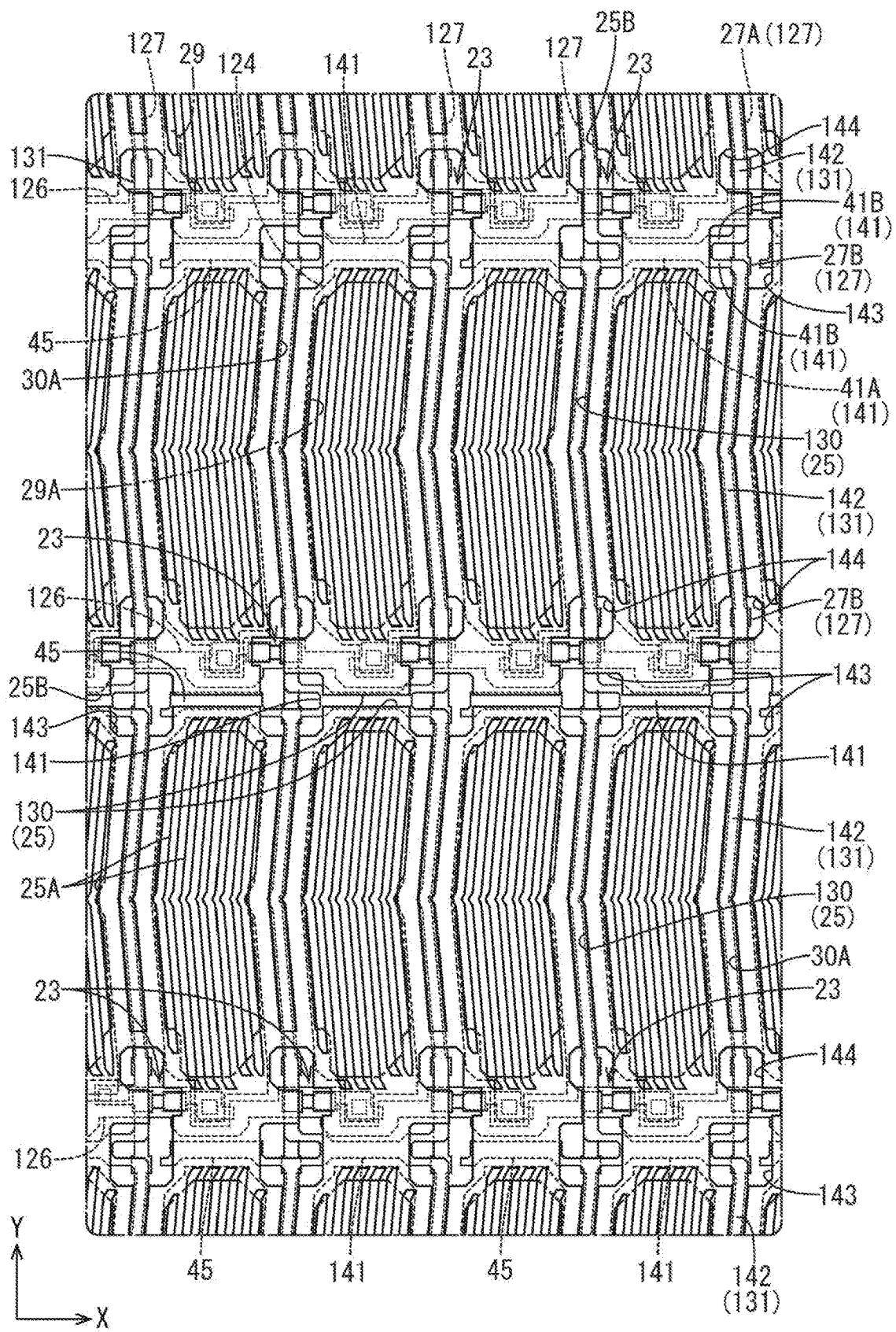
FIG. 11 is a plan view of arrangement of pixels of a liquid crystal panel according to a second embodiment.
Figure 12:
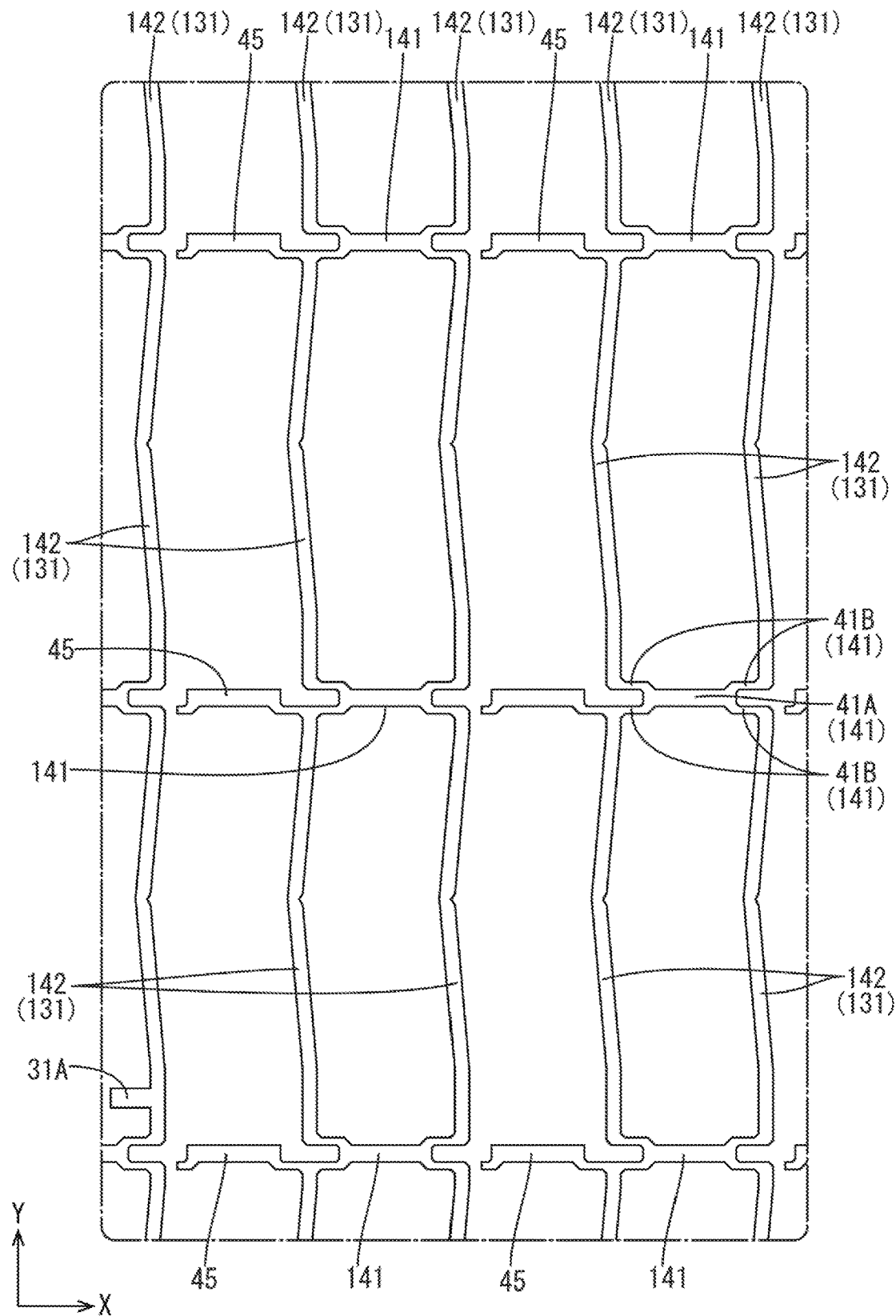
FIG. 12 is a plan view of a pattern of the third metal film included in the array substrate.
Figure 13:
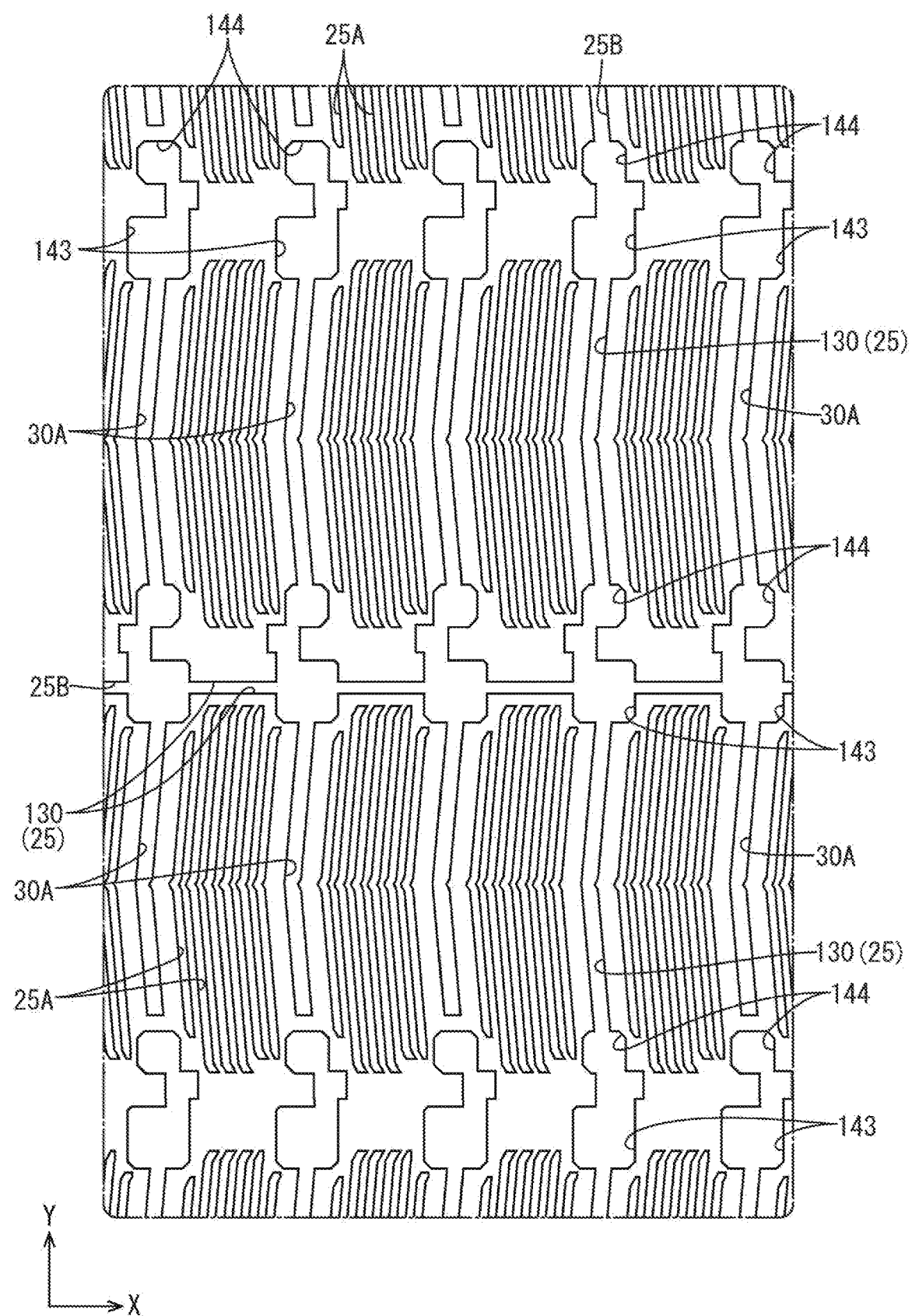
FIG. 13 is a plan view of a pattern of the second transparent electrode film included in the array substrate.

As shown in FIGS. 11 and 12, inter-line connections 141 according to the second embodiment include a group of inter-line connections 141 each of which is sandwiched between touch electrodes 130 adjacent to each other such that most of the inter-line connection 141 does not overlap the touch electrode 130 and a group of inter-line connections 141 arranged such that the whole of the inter-line connections 141 overlap the touch electrode 130. In other words, two touch lines 131 adjacent to each other in the X-axis direction and connected in common to the same touch electrode 130 are interconnected through inter-line connections 141 each of which is sandwiched between touch electrodes 130 adjacent to each other in the Y-axis direction such that most of the inter-line connection 141 does not overlap the touch electrode 130 and are interconnected also through inter-line connections 141 that overlap the touch electrode 130 as they traverse the touch electrode 130. The inter-line connections 141 overlapping the touch electrode 130 are each sandwiched between a pixel electrode 124 and a gate line 126 in the Y-axis direction and are arranged such that a series of the pixel electrode 124, the inter-line connection 141, and the gate electrode 126 appear repeatedly in the Y-axis direction. A pitch of arrangement of the inter-line connections 141 overlapping the touch electrode 130 in the Y-axis direction is equal to the pitch of arrangement of the pixels PX in the Y-axis direction, and the number of the inter-line connections 141 making up a row in the Y-axis direction is substantially equal to the number of the pixels PX overlapping the touch electrodes 130 and making up a row in the Y-axis direction and to that of gate lines 126 making up a row in the Y-axis direction. In this manner, the maximum number of the inter-line connections 141 provided, the inter-line connections 141 overlapping the touch electrode 130, is ensured. According to this embodiment, as a result of the above arrangement of the inter-line connections 141, the second dummy connection portions 46 located on the same lines on which the inter-line connections 41 are located (see FIG. 2) in the first embodiment are dispensed with.

Putting the inter-line connections 41 in the limited arrangement in which most of the inter-line connections 41 do not overlap the touch electrode 30 (see FIG. 2), as in the first embodiment, may lead to the following problem. When a touch electrode 30 to be connected to a touch line 31 overlapping a broken source line 27 overlaps the broken source line 27, electrically isolating the touch line 31 from an inter-line connection 41 during wire-breaking repair work renders signal transmission to the touch electrode 30 impossible. When the touch line 31 electrically isolated from the inter-line connection 41 has a pad 31A connected to the touch electrode 30, the wire-breaking repair work short-circuits the source line 27 and the touch electrode 30. According to the second embodiment, however, the inter-line connections 141 include the group of inter-line connections 141 overlapping the touch electrode 130, as shown in FIGS. 11 and 12. In this configuration, when a touch electrode 130 to be connected to a touch line 131 overlapping a broken source line 127 overlaps the broken source line 127, even if the touch line 131 is electrically isolated from an inter-line connection 141 during wire-breaking repair work, another inter-line connection 141 overlapping the touch electrode 130 keeps touch lines 131 interconnected. An inter-line connection 141 to be cut is selected properly such that the touch line 131 electrically isolated from the inter-line connection 141 does not include the pad 31A connected to the touch electrode 130. Through this process, the short circuit between the source line 127 and the touch electrode 130 resulting from the wire-breaking repair work is avoided. This increases cases where wire-breaking failures are remedied by repair work, thus improving a non-defective ratio. In addition, ensuring the maximum number of the inter-line connections 141 provided, each inter-line connection 141 being sandwiched between the pixel electrode 124 and the gate line 126, allows using all divided touch lines 142 within a range occupied by the touch electrode 130 for wire-breaking repair work. This further increases cases where wire-breaking failures are remedied by repair work, thus further improving the non-defective ratio. In this embodiment, the number of the inter-line connections 141 provided becomes greater than the number of the inter-line connections 41 of the first embodiment. As a result, the number of first openings 143 and second openings 144 formed on the touch electrode 130 also becomes greater than the number of the first openings 43 and second openings 44 of the first embodiment, as shown in FIGS. 11 and 13. The area of the touch electrode 130 thus becomes smaller than that of the touch electrode 30 of the first embodiment.

As shown described above, according to this embodiment, the touch electrodes 130 are arranged at intervals, and the inter-line connections 141 include the group of inter-line connections 141 overlapping the touch electrode 130 and the group of inter-line connections 141 each of which is sandwiched between touch electrodes 130 adjacent to each other such that the inter-line connection 141 does not overlap the touch electrode 30. Putting the inter-line connections 41 in the limited arrangement in which the inter-line connections 41 do not overlap the touch electrode 30 leads to the following problem. When a touch electrode 30 to be connected to a touch line 31 overlapping a broken source line 27 overlaps the broken source line 27, electrically isolating the touch line 31 from an inter-line connection 41 during wire-breaking repair work leads to the problem that signal transmission to the touch electrode 30 becomes impossible. When the touch line 31 electrically isolated from the inter-line connection 41 has the pad 31A connected to the touch electrode 30, the wire-breaking repair work causes the problem that the source line 27 and the touch electrode 30 are short-circuited. However, the inter-line connections 141 including the group of inter-line connections 141 overlapping the touch electrodes 130 provide solutions to these problems. When a touch electrode 130 to be connected to a touch line 131 overlapping a broken source line 127 overlaps the broken source line 127, even if the touch line 131 is electrically isolated from an inter-line connection 141 during wire-breaking repair work, another inter-line connection 141 overlapping the touch electrode 130 keeps touch lines 131 interconnected. An inter-line connection 141 to be cut is selected properly such that the touch line 131 electrically isolated from the inter-line connection 141 does not include the pad 31A connected to the touch electrode 130. Through this process, the short circuit between the source line 127 and the touch electrode 130 resulting from the wire-breaking repair work is avoided. This increases cases where wire-breaking failures are remedied by repair work, thus improving the non-defective ratio.

The liquid crystal panel according to the second embodiment includes the gate lines 126 extending in such a way as to intersect the source lines 127 and the touch lines 131, the gate lines 126 being arranged at intervals such that they at least sandwich the pixel electrodes 124 therebetween. The pixel electrodes 124 are arranged at intervals in the direction of extension of the source lines 127. The inter-line connections 141 are each sandwiched between a pixel electrode 124 and a gate line 126 and are arranged such that a series of the pixel electrode 124, the inter-line connection 141, and the gate line 126 appear repeatedly in the direction of extension of the source lines 127. In this configuration, the maximum number of the inter-line connection 141 provided, each inter-line connection 141 being sandwiched between the pixel electrode 124 and the gate line 126, is ensured. This further increases cases where wire-breaking failures are remedied by repair work, thus further improving the non-defective ratio.

Third Embodiment

A third embodiment will be described with reference to FIG. 14. In the third embodiment, a touch line 231 and an inter-line connection 241 provided by changing the configuration of the touch line and the inter-line connection of the first embodiment will be described. The same structure and effects as described in the first embodiment will not be described repeatedly.

Figure 14:
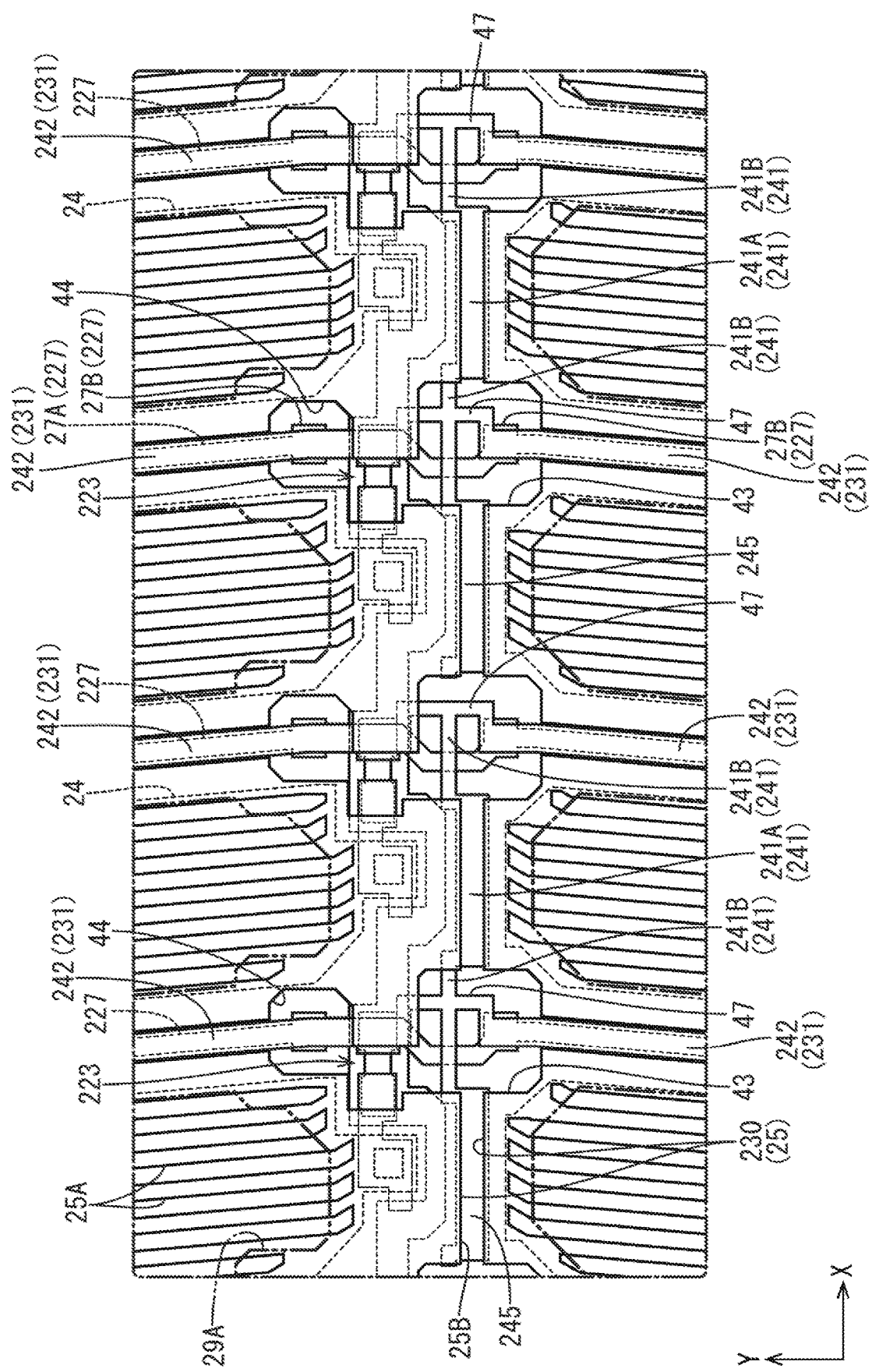
FIG. 14 is a plan view of the vicinity of inter-line connections in the array substrate and the CF substrate that make up a liquid crystal panel according to a third embodiment.

As shown in FIG. 14, the touch line 231 according to the third embodiment includes divided touch lines 242 and divided touch line connections (divided line connections) 47 interconnecting divided touch lines 242 adjacent to each other. Each divided touch line connection 47 projects from an end of a divided touch line 242 toward a side opposite to a TFT 223 in the X-axis direction and then extends in the Y-axis direction. To a middle part of the divided touch line connection 47, a second connection portion 241B making up an inter-line connection 241 is connected. A pair of such second connection portions 241B are formed respectively on both sides of a first connection portion 241A such that each second connection portion 241B is continuous with the first connection portion 241A. Two second connection portions 241B making up one inter-line connection 241 are connected respectively to two divided touch line connections 47 making up two touch lines 231, respectively, which are connected in common to the same touch electrode 230. According to this embodiment, in a process of repairing a broken source line 227, a second connection portion 241B is cut by a laser beam to electrically isolate a touch line 231 overlapping the broken source line 227 from other touch lines 231. Meanwhile, a divided touch line connection 47 is cut by a laser beam to electrically isolate a divided touch line 242 overlapping the broken source line 227 from other divided touch lines 242. In this process, in comparison with the first embodiment in which the inter-line connection 41 has both the function of interconnecting touch lines 31 and the function of interconnecting divided touch lines 42 (see FIG. 2), a second connection portion 241B to be cut and a divided touch line connection 47 to be cut can be selected properly when wire-breaking repair work is carried out. This improves a degree of freedom in executing the wire-breaking repair work. At the part where the divided touch line connection 47 projects in the X-axis direction, the source line 227 projects to the side opposite to the side to which the divided touch line connection 47 projects. This configuration provides a positional margin that facilitates laser beam emission, thus improving work efficiency. A first dummy connection portion 245 has a narrower portion connected to a wider portion and to a divided touch line connection 47 making up a touch line 231. This structure applies also to a second dummy connection portion (not depicted).

As described above, according to this embodiment, the touch line 231 includes the divided touch lines 242 sandwiching inter-line connections 241 therebetween in the direction of extension of the divided touch lines 242, and the divided touch line connections (divided line connections) 47 interconnecting divided touch lines 242 adjacent to each other. Each second connection portion 241B is connected to each divided touch line connection 47. In this configuration, in a process of repairing a broken source line 227, a second connection portion 241B is cut to electrically isolate a specific touch line 231 from other touch lines 231, and a divided touch line connection 47 is cut to electrically isolate a specific divided touch line 242 from other divided touch lines 242. In comparison with the case where the inter-line connection 41 has both the function of interconnecting touch lines 31 and the function of interconnecting divided touch lines 42, therefore, a second connection portion 241B to be cut and a divided touch line connection 47 to be cut can be selected properly when wire-breaking repair work is carried out. This improves a degree of freedom in executing the wire-breaking repair work.

Other Embodiments

The technology described herein is not limited to the embodiments described above with reference to the drawings. The following embodiments may be included in the technical scope.

(1) The first and second embodiments have been described as the case where in the process of repairing the broken source line, respective second connection portions of two inter-line connections sandwiching the broken spot therebetween are cut but a touch line is not cut. It may be possible, however, that in the process of repairing the broken source line, two inter-line connections sandwiching the broken spot therebetween are not cut and two spots of the touch line between which the broken spot is sandwiched is cut, instead. In such a case, it is preferable that as in the third embodiment, the source line be projected in the X-axis direction to provide the positional margin that facilitates laser beam emission.

(2) The second embodiment has been described as the case where the maximum number of the inter-line connections overlapping the touch electrode are provided. The number of the inter-line connections provided, the inter-line connections overlapping the touch electrode, however, may be smaller than the maximum number of the inter-line connections provided (i.e., the number of pixels and of gate lines provided, the pixels and gate lines overlapping the touch electrode). In such a case, it is preferable that in a section where no inter-line connection is disposed, the second dummy connection portion be disposed in place of the inter-line connection.

(3) The above embodiments have been described as the process of repairing the source line having one broken spot. Obviously, a process of repairing the source line having several broken spots may also be carried out.

(4) The above embodiment have been described as the case where two touch lines are connected in common to the same touch electrode. Three or more touch lines, however, may be connected in common to the same touch electrode. In such a case, it is preferable that three or more touch lines be interconnected through inter-line connections, but such a configuration is not absolute necessity.

(5) The above embodiments have been described as the case where in the liquid crystal panel having the screen size of 16.1 inches and offering the resolution performance equivalent to "FHD", each touch electrode has one side of 5.1 mm or larger in length. However, a liquid crystal panel equal in screen size and resolution conditions to the above liquid crystal panel may have its touch electrode reduced in the length of its one side to be smaller than 5.1 mm. In such case, connecting a set of two touch lines to every touch electrode is difficult. It is preferable, for example, that several touch lines be connected to a touch electrode located distant from the driver as a single touch line be connected to a touch electrode located close to the driver. This configuration is effective for suppressing a voltage drop.

(6) The screen size and resolution of the liquid crystal panel, as specified in the above embodiments, may be changed properly. In such a case, a lower limit to the length of one side of the touch electrode, the lower limit being necessary for allowing at least two touch lines to be connected to every touch electrode, is changed, too. The pitch of arrangement of the pixels making up the liquid crystal panel may also be changed properly.

(7) The number, plane shape, and arrangement of the second connection portions provided, the second connection portions making up the inter-line connections, as specified in the above embodiments, may be changed properly. The plane shape and arrangement of the first connection portions may also be changed properly.

(8) The number, plane shape, and arrangement of the divided touch line connections provided, as specified in the third embodiment, may be changed properly.

(9) The range, plane shape, and arrangement of the first openings and second openings formed on the touch electrodes, as specified in the above embodiments, may be changed properly.

(10) The above embodiments have been described as the case where the same number of the touch lines as the number of the source lines are provided such that all the touch lines overlap all the source line, respectively. The touch lines, however, may be provided such that the touch lines do not overlap all the source line. In such a case, the number of the touch lines provided is smaller than the number of the source lines provided.

(11) The above embodiments have been described as the case where the source line has the line body and the wider portions. However, the touch line, instead of the source line, may have the line body and the wider portions or the source line as well as the touch line may have the line body and the wider portions.

(12) The above embodiments have been described as the case where the inter-line connection is made of the third metal film as the touch lined is. However, the inter-line connection may be made of the first metal film or second metal film located in a layer different from the layer in which the touch line is formed. In such a case, the inter-line connection and the touch line are connected through contact holes bored on the insulating film interposed between the inter-line connection and the touch line.

(13) The above embodiments have been described as the case where wire-breaking repair work is carried out when a source line is broken. Not only the wire-breaking but also a short-circuit failure may occur at the source line, which short-circuits the source line to a gate line or the like. In such a case, repair work using a part of a touch line can be carried out in the same manner as described above.

(14) The above embodiments have been described as the case where four drivers are mounted on the array substrate. The number of drivers mounted on the array substrate, however, can be change properly.

(15) The above embodiments have been described as the case where the array substrate is provided with the gate circuit. However, the array substrate may dispense with the gate circuit and be provided with a gate driver having the same function as the function of the gate circuit. It may also possible that the gate circuit is mounted on one side of the array substrate only.

(16) The plane shape of the pixel overlapping openings of the common electrode, as specified in the above embodiments, may be changed properly. The pixel overlapping openings may be V-shaped or linear in their plane shapes. The number and the pitch of arrangement of the pixel overlapping openings provided may be changed properly.

(17) The above embodiments have been described as the case where the TFTs are arranged in a zigzagged pattern on the array substrate in a plan view. The TFTs, however, may be arranged in a matrix pattern in a plan view.

(18) The above embodiments have been described as the case where the shading portions are included in the CF substrate. The shading portions, however, may be included in the array substrate.

(19) The semiconductor film making up the channel of the TFT may be made of a material different from the materials specified in the above embodiments. For example, the semiconductor film may be made of polysilicon. In such a case, it is preferable that the TFT be of a bottom gate structure or a top gate structure in which a shading film is provided on the lower layer side to the channel (side on which the backlight unit is disposed).

(20) The above embodiments have been described as the case where the touch panel pattern detects a touch by the self-capacitance method. The touch panel pattern, however, may detect a touch by a mutual-capacitance method.

(21) In the above embodiments, the transmissive liquid crystal panel has been described. The technology described herein, however, may also be applied to a reflective liquid crystal panel and a semi-transmissive liquid crystal panel.

(22) The above embodiments have been described as the case where the liquid crystal display device (liquid crystal panel, backlight unit) has a plane shape of a laterally elongated rectangle. The plane shape of the liquid crystal display device may be altered to another shape such as an elongated rectangular shape, a square shape, a circular shape, a semi-circular shape, an oval shape, an elliptical shape, and a trapezoidal shape.

The invention claimed is:

1. A display device comprising:
pixel electrodes;
signal lines that supply image signals to the pixel electrodes, wherein each of the pixel electrodes receives an image signal from one of the signal lines;
lines arranged such that the lines at least partly overlap the signal lines, respectively, via a first insulating film and do not overlap the pixel electrodes;
inter-line connections interconnecting the lines, the inter-line connections being arranged at intervals in a direction of extension of the lines;
a common electrode arranged such that the common electrode at least partly overlaps the pixel electrodes via a second insulating film; and
position detection electrodes defined by divided portions of the common electrode, the position detection electrodes creating capacitance between the position detection electrodes and a position input object that makes position input and detecting a position of input made by the position input object, wherein
the lines are connected to the position detection electrodes to supply position detection signals and common signals to the position detection electrodes in a time-division manner, and
the common signals set the position detection electrodes to a reference potential.

2. The display device according to claim 1, wherein some of the lines interconnected through the inter-line connections are connected to one of the position detection electrodes.

3. The display device according to claim 1, wherein each of the signal lines or each of the lines includes a line body and a wider portion wider than the line body.

4. The display device according to claim 3, wherein each of the position detection electrodes includes an opening encircling the wider portion.

5. The display device according to claim 1, wherein each of the inter-line connections includes at least one first connection portion and at least one second connection portion connecting the first connection portion to one of the lines, and
the at least one second connection portion is narrower than the at least one first connection portion.

6. The display device according to claim 5, wherein each of the position detection electrodes includes an opening encircling the at least one second connection portion.

7. The display device according to claim 5, wherein
each of the lines includes divided lines arranged such that each of the inter-line connections is sandwiched between the divided lines in the direction of extension of the lines, and
the at least one second connection portion includes second connection portions connected to the divided lines adjacent to the inter-line connection in the direction of extension of the lines, respectively.

8. The display device according to claim 5, wherein each of the lines includes:
divided lines arranged such that each of the inter-line connections is sandwiched between the divided lines in the direction of extension of the lines; and
a divided line connection interconnecting the divided lines adjacent to each other, and
the at least one second connection portions is connected to the divided line connection.

9. The display device according to claim 1, wherein
the position detection electrodes are arranged at intervals, and the inter-line connections are each located between the position detection electrodes adjacent to each other such that the inter-line connections do not overlap the position detection electrodes.

10. The display device according to claim 9, further comprising scanning lines extending to intersect the signal lines and the lines, wherein
the scanning lines are arranged at intervals such that at least the pixel electrodes are sandwiched between the scanning lines,
the inter-line connections are arranged such that each of the inter-line connections is sandwiched between one of the pixel electrodes and one of the scanning lines,
the display device further includes an electrode overlapping dummy connection portion connected to one of the lines,
the electrode overlapping dummy connection portion overlaps one of the position detection electrodes and is sandwiched between another one of the pixel electrodes and another one of the scanning lines.

11. The display device according to claim 1, wherein
the position detection electrodes are arranged at intervals, and
a first group of the inter-line connections are arranged to overlap the position detection electrodes and a second group of the inter-line connections are each between the position detection electrodes adjacent to each other and do not overlap the position detection electrodes.

12. The display device according to claim 11, further comprising scanning lines extending to intersect the signal lines and the lines, wherein
the scanning lines are arranged at intervals such that at least the pixel electrodes are sandwiched between the scanning lines,
the pixel electrodes are arranged at intervals in a direction of extension of the signal lines, and
the inter-line connections are arranged such that each of the inter-line connections is sandwiched between one of the pixel electrodes and one of the scanning lines and a series of one of the pixel electrodes, one of the scanning lines, and one of the inter-line connections are repeatedly arranged in the direction of extension of the signal lines.

13. The display device according to claim 1, further comprising scanning lines extending to intersect the signal lines and the lines, wherein
the scanning lines are arranged at intervals such that at least the pixel electrodes are sandwiched between the scanning lines,
the inter-line connections are arranged such that each of the inter-line connections is sandwiched between one of the pixel electrodes and one of the scanning lines,
the lines include two lines that are adjacent to each other and interconnected through one of the inter-line connections and another two lines that are adjacent to each other and not interconnected, and
the display device further includes a dummy connection portion connected to one of the other two lines that are adjacent to each other and not interconnected, the dummy connection portion being sandwiched between another one of the pixel electrodes and another one of the scanning lines.

14. The display device according to claim 13, wherein the dummy connection portions are arranged such that a series of one of the pixel electrodes, one of the scanning lines, and one of the dummy connection portions are repeatedly arranged in a direction of extension of the signal lines.

* * * * *